United States Patent
Fujii et al.

(10) Patent No.: US 8,180,391 B2
(45) Date of Patent: May 15, 2012

(54) COMBINED COMMUNICATIONS SYSTEM, PROHIBITING-SIGNAL TRANSMITTING APPARATUS, WIRELESS BASE STATION, AND METHOD

(75) Inventors: Hiromasa Fujii, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 880 days.

(21) Appl. No.: 12/243,298

(22) Filed: Oct. 1, 2008

(65) Prior Publication Data

US 2009/0098904 A1    Apr. 16, 2009

(30) Foreign Application Priority Data

Oct. 10, 2007  (JP) ................................ 2007-264804
Jul. 22, 2008  (JP) ................................ 2008-188743

(51) Int. Cl.
*H04Q 7/20*  (2006.01)

(52) U.S. Cl. ............... 455/552.1; 455/553.1; 455/550.1; 455/67.11; 455/434; 455/426.1; 370/310; 370/328; 370/329; 370/332; 370/343

(58) Field of Classification Search ............... 455/552.1, 455/553.1, 550.1, 67.11, 67.15, 423–425, 455/422.1, 403, 426.1, 426.2, 435.2, 436–444, 455/434; 370/310, 328, 329, 330, 332, 334, 370/337, 338, 343, 347
See application file for complete search history.

(56) References Cited

U.S. PATENT DOCUMENTS

| | | | |
|---|---|---|---|
| 5,548,809 A | 8/1996 | Lemson | |
| 5,655,217 A * | 8/1997 | Lemson | ........................ 455/513 |
| 2007/0010255 A1 | 1/2007 | Liu et al. | |
| 2007/0104140 A1 | 5/2007 | Ashish et al. | |
| 2007/0207737 A1 | 9/2007 | Hui et al. | |

OTHER PUBLICATIONS

Domenico Porcino, et al., "Ultra-Wideband Radio Technology: Potential and Challenges Ahead", IEEE Communications Magazine, Jul. 2003, pp. 66-74.

"Part 11: Wireless LAN Medium Access Control (MAC) and Physical Layer (PHY) specifications, Amendment 5: Spectrum and Transmit Power Management Extensions in the 5 GHz band in Europe", IEEE Computer Society, IEEE Standard for Information technology—Telecommunications and information exchange between systems—Local and metropolitan area networks—Specific requirements, IEEE Std 802.11h™—2003, Oct. 2003, 74 pages.

Extended European Search Report issued Feb. 22, 2011, in Patent Application No. 08253212.8.

* cited by examiner

*Primary Examiner* — Keith Ferguson
(74) *Attorney, Agent, or Firm* — Oblon, Spivak, McClelland, Maier & Neustadt, L.L.P.

(57) ABSTRACT

A prohibiting-signal transmitting apparatus for use in a combined system such that there is at least a partial overlap between bands allocated to an old communications system and bands allocated to a new communications system is disclosed. The apparatus includes a unit which monitors for a band-in-use, over which communications are actually being conducted, out of the bands allocated to the old communications system; a unit which generates a prohibiting signal indicating that the band-in-use should not be used in the new communications system; and a unit which transmits the prohibiting signal to a communications apparatus of the new communications system.

29 Claims, 23 Drawing Sheets

| PREAMBLE | INTERFERENCE-REPORT SIGNAL TRANSMITTER ID | USAGE RESTRICTED REQUIRED BAND |

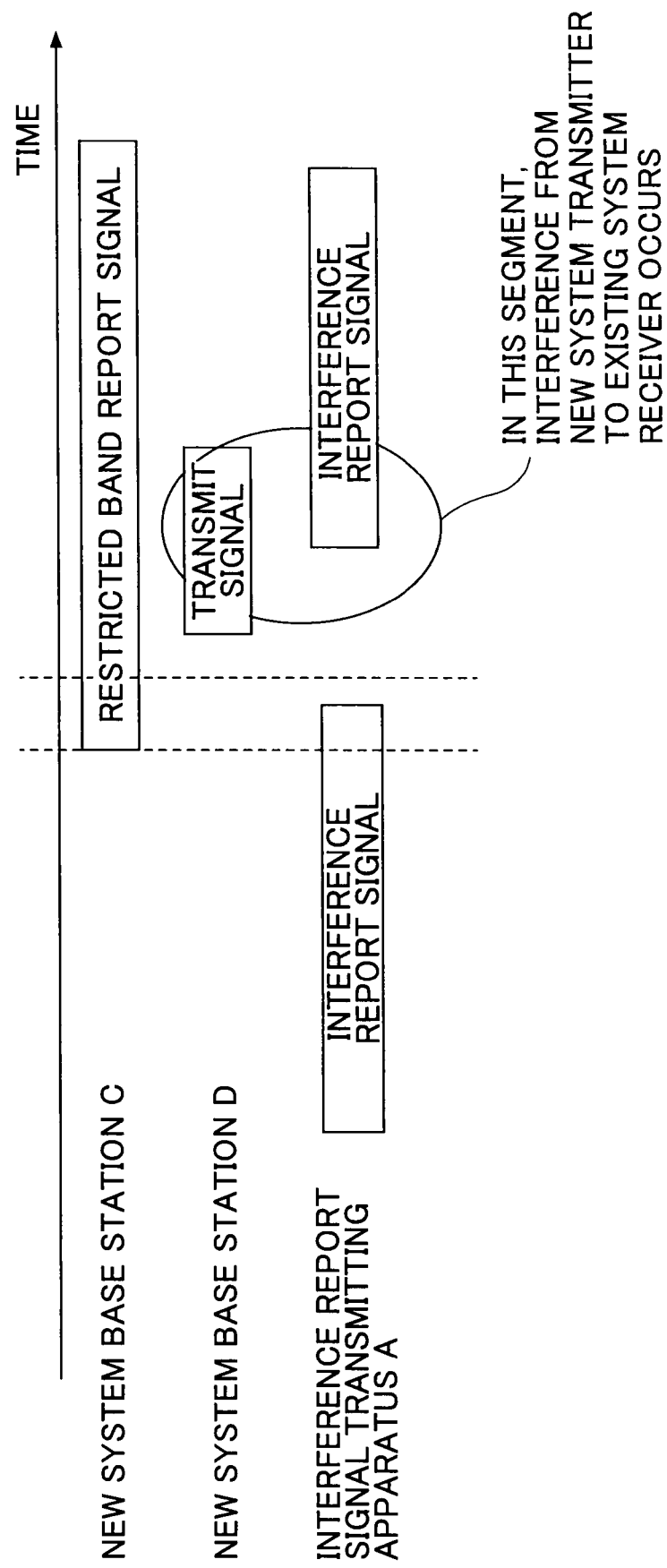

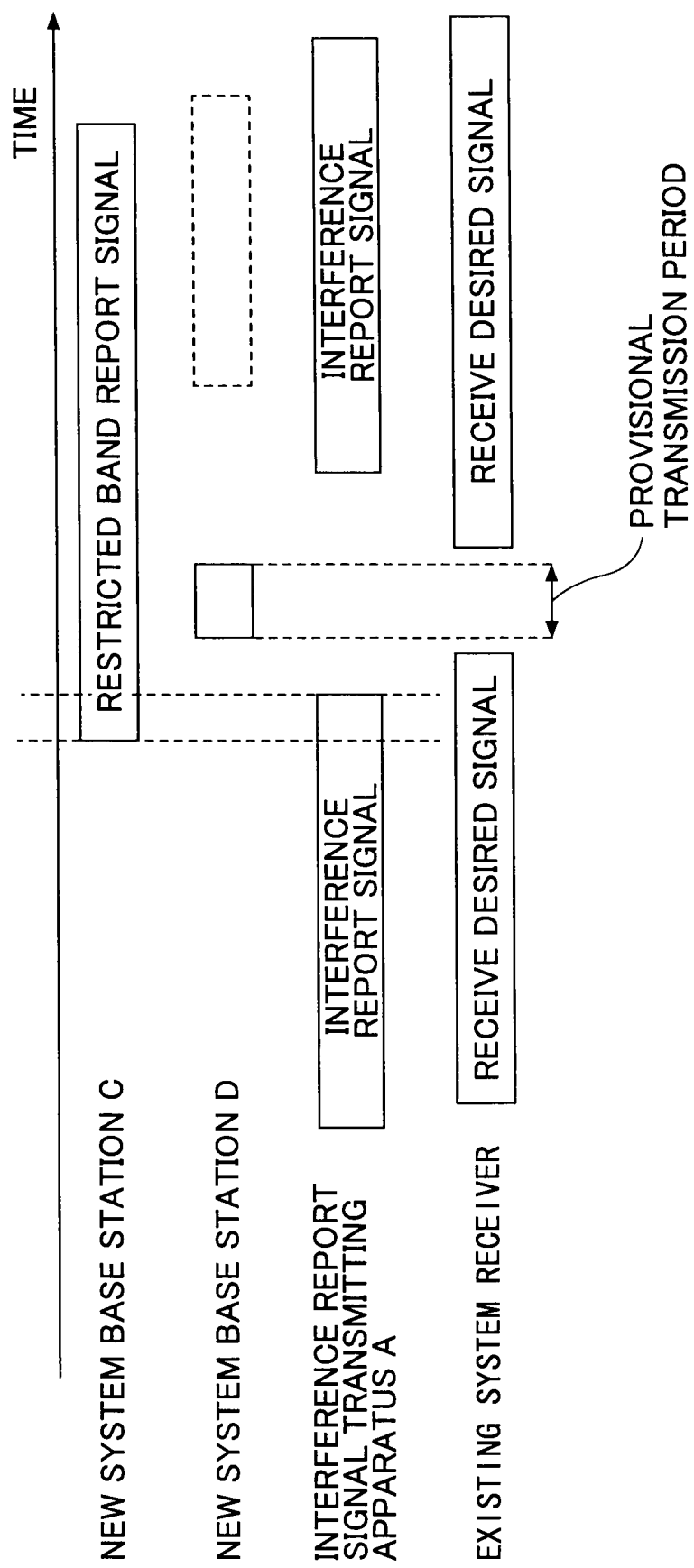

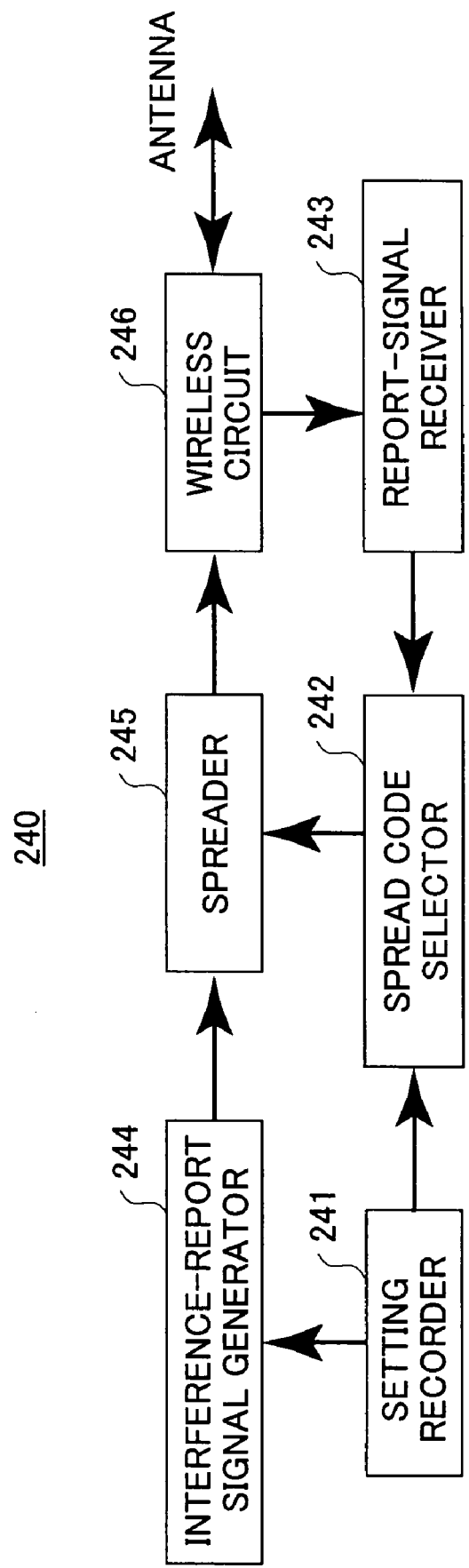

COMBINED COMMUNICATIONS SYSTEM, PROHIBITING-SIGNAL TRANSMITTING APPARATUS, WIRELESS BASE STATION, AND METHOD

BACKGROUND OF THE INVENTION

1. Field of the Invention

The present invention is related to a combined communications system having multiple communications systems including a new communications system and an old communications system, of which system bandwidths overlap at least partially.

2. Description of the Related Art

Wireless communications are utilized in various applications such as mobile telephone, wireless LAN, broadcasting (terrestrial, satellite), radar, and positioning. It is anticipated that frequency allocations will be considered with respect to these existing systems and also in the future with respect to new systems such as the third generation (3G) mobile communications system-evolved long-term evolution (LTE) system, which is being considered in 3GPP, and the fourth generation mobile communications systems. In addition, with a trend toward higher-speed mobile communications systems in recent years, there is also a trend toward an increased bandwidth required for allocation.

On the other hand, there is a limit to wireless frequency resources. Moreover, frequency utilization varies among countries and regions. Taking into account such circumstances as described above, it will not be easy to uniformly allocate to all countries and regions, exclusively for new systems in the future, a wide, single bandwidth. Moreover, the propagation characteristics vary from one frequency band to another. Thus, it is anticipated that, depending on applications, the degree of freedom in allocating a required frequency band will be somewhat limited, making frequency allocations more difficult.

Then, a scheme to ensure that existing systems are not affected even in currently-utilized frequency bands may be introduced to allow allocating frequencies to new systems, and utilizing frequencies more efficiently.

A related-art method as disclosed in Non-patent document 1 (Ultra-wideband radio technology: potential and challenges ahead. Porcino, D., Hirt, W.; Communications Magazine, IEEE Volume 41, Issue 7, Jul. 2003 pp. 66-74), as a scheme of sharing frequencies between an old system and a new system, spatially limits the use by the new system to indoors, and fixes the limits of the transmit power level according to the existing system.

In a related-art method as disclosed in Non-patent document 2 (IEEE 802.11 WG, Part 11: Wireless LAN Media Access Control (MAC) and Physical layer (PHY) specifications, Amendment 5: Spectrum and Transmit Power Management Extensions in 5 GHz band in Europe, October 2003), as in DFS, which is an IEEE 802.11h standard, signals are detected over a predetermined time period prior to transmission of traffic data, whether the existing system uses the band in question is checked, and the traffic data are transmitted using a band not used by the existing system.

As disclosed in Non-patent document 1, in a scheme such that the location of use of the frequency band as well as the transmit power level are restricted in a fixed manner, even when there are no existing terminals in the vicinity that may be interfered with, the location of use and the transmit power level is restricted, which is not desirable from the point of view of effectively utilizing frequencies. Frequency resources available for a new system could be severely limited especially when the utilization of frequencies vary from one region to another or existing communications systems which are not frequently used use various frequency bands.

Moreover, as disclosed in Non-patent document 2, with a scheme of detecting whether an existing system is being utilized in the vicinity to avoid interference, when the existing system is a broadcast receiver or a satellite-system receiver, effectively avoiding interference may be difficult. This means that resources allocatable to a new system may be very limited. This is because, for example, regardless of whether a receiver of the existing system operates in the vicinity of each transmitter, the new system operation is restricted to the whole of the large broadcasting area. This aspect is also not desirable regarding effectively utilizing frequencies. Moreover, for seeking to detect the receiver operation of the existing system, as the receiver itself of the broadcasting system does not transmit any signal, it is simply difficult to appropriately detect the receiver of the broadcasting system with the new system.

SUMMARY OF THE INVENTION

The present invention aims to use frequencies effectively when multiple communication systems including an old communications system and a new communications system coexist such that there is at least a partial overlap between the system bandwidth of the old system and the system bandwidth of the other system.

In an embodiment of the present invention, a prohibiting-signal transmitting apparatus for use in a combined system, such that there is at least a partial overlap between bands allocated to an old communications system and bands allocated to a new communications system, includes a unit which monitors over which band-in-use communications are actually conducted, out of the bands allocated to the old communications system; a unit which generates a prohibiting signal indicating that the band-in-use should not be used in the new communications system; and a unit which transmits the prohibiting signal to a communications apparatus of the new communications system.

The embodiment as described above of the present invention makes it possible to use frequencies effectively when multiple communications systems including an old communications system and a new communications system coexist such that there is at least a partial overlap between the system bandwidth of the old system and the system bandwidth of the new system.

Other objects and further features of the present invention will be apparent from the following detailed description when read in conjunction with the accompanying drawings.

BRIEF DESCRIPTION OF THE DRAWINGS

FIG. 22 is a diagram illustrating occurrence of interference when detecting a received restricted-band report signal to stop transmitting an interference report signal;

FIG. 23 is a diagram illustrating a method which avoids "temporarily interfered condition" with a provisional transmission period; and FIG. 24 is a diagram illustrating an exemplary configuration of the interference-report signal transmitting apparatus.

DETAILED DESCRIPTION OF PREFERRED EMBODIMENTS

In the following, embodiments of the present invention are described with reference to the accompanying drawings.

Figure 1:
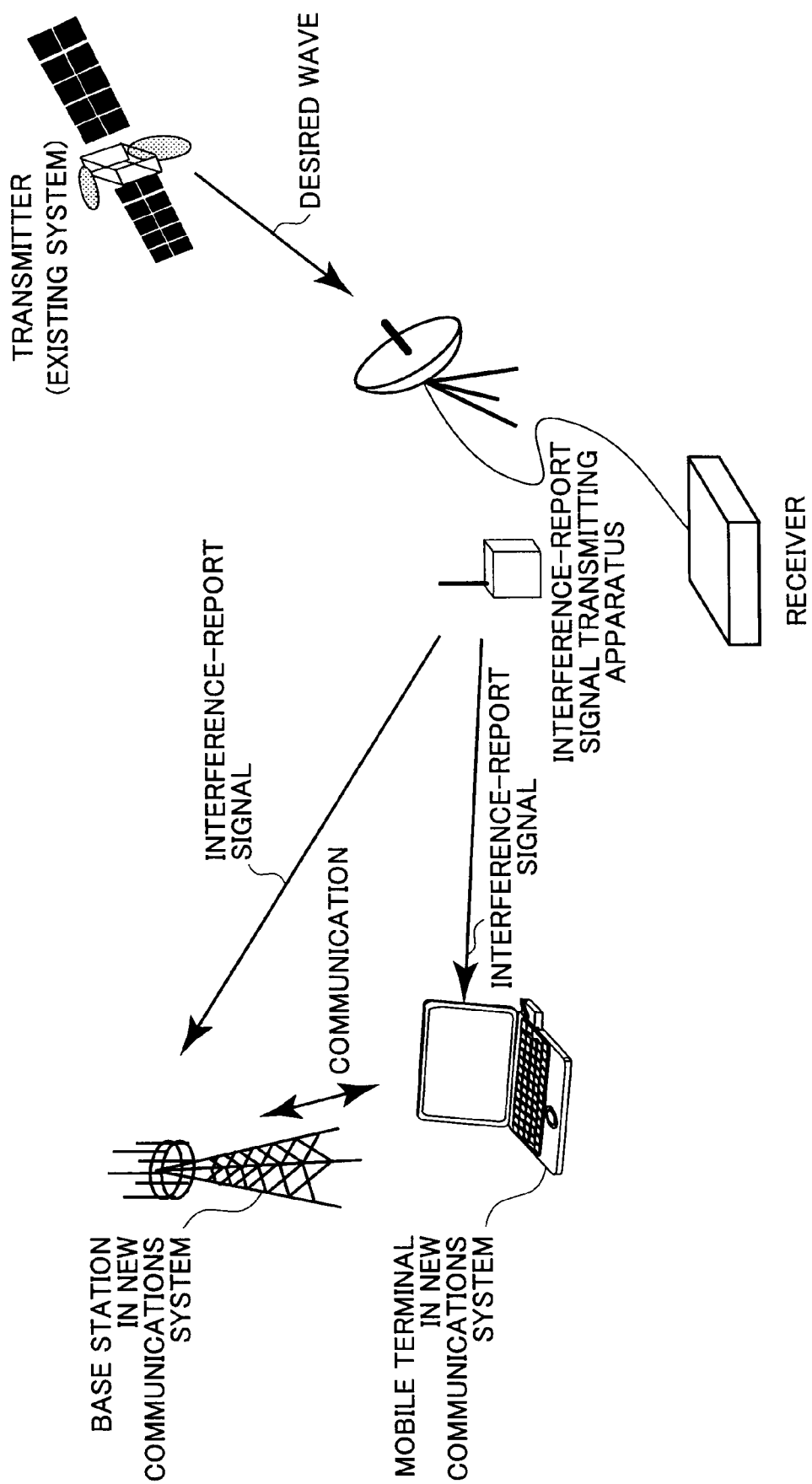
FIG. 1 is a system configuration diagram illustrating systems which may be used in the present invention.

FIG. 1 shows a system configuration as envisaged in the present specification. Here, it is assumed that there is at least a partial overlap between a band in use by a satellite-broadcasting system which is an existing system, and a system band allocated to a communications system which is a new system.

FIG. 1 shows a system configuration as envisaged in the present specification. Here, it is assumed that there is at least a partial overlap between a band in use by a satellite-broadcasting system which is an existing system, and a system band allocated to a communications system which is a new system.

As priority should be given to the use of frequencies allocated to the existing system, the new system should operate without interfering with the satellite system.

In a method of the present embodiment, an interference-report signal transmitting apparatus which is "a prohibiting-signal transmitting apparatus" is provided in the vicinity of a receiver of the existing system. The interference-report signal transmitting apparatus transmits an interference-report signal which is "a prohibiting signal" to the new system to request the new system to refrain using a part of the band. On the other hand, the new system monitors the interference-report signal transmitted from the interference-report signal transmitting apparatus, and freely uses the overlapping part of the band only when the interference-report signal is not detected. Here, the interference-report signal is to be transmitted using a dedicated channel provided for its transmission.

In FIG. 1, the receiver and the interference-report signal transmitting apparatus of the existing system are provided separately. However, these may be provided in the same apparatus, or may use a common antenna or separate antennas. Furthermore, multiple antennas having the same directivity may be used.

Figures 2, 3:
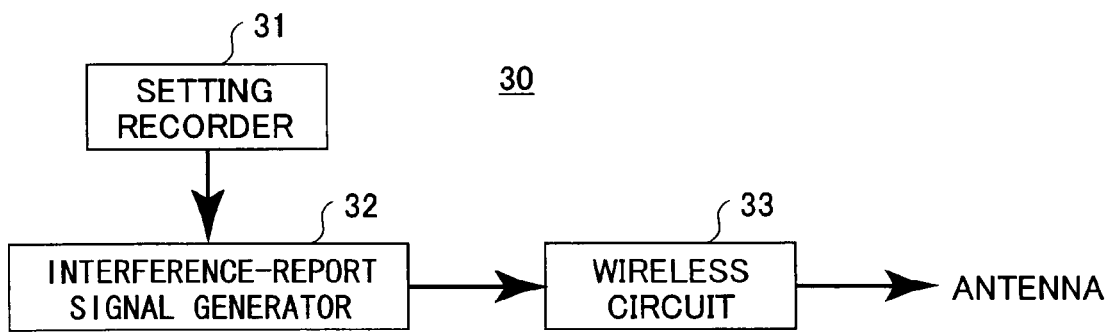
FIG. 2 is a diagram illustrating a format example of an interference report signal.
FIG. 3 is a diagram illustrating a configuration of an interference-report signal transmitting apparatus.

FIG. 2 shows an exemplary format of the interference-report signal. A preamble, which is a predetermined signal pattern, is used for signal detecting and channel estimating in an interference-report signal detector of a new-system base station. Usage-restriction required band is an ID corresponding to a band requiring usage restriction.

Moreover, the interference-report signal may include an interference-report signal transmitting apparatus ID, required improvement amount, allowable absolute transmit level, etc. Furthermore, while not shown, an error-detecting bit may be added to each of the usage-restriction required band and interference-report signal transmitting apparatus ID, etc., or one error-detecting bit may be added to a set of several information items. Similarly, error-correction coding may be performed in any appropriate information units.

FIG. 3 shows a configuration of an interference-report signal transmitting apparatus 30. A setting recorder 31 stores bands for which the interference-report signal transmitting apparatus requests usage restriction. Based on such information as described above, an interference-report signal generator 32 generates an interference report signal which is modulated to a predetermined frequency at a wireless circuit 33, and transmitted.

As described above, the base station of the new system receives the interference-report signal and operates based on the signal. Then, it is ensured that all interference conditions can be ascertained by the base station and that a channel used by the existing system is not used. The channel used by the existing system may be called a "band-in-use" from the point of view of the existing system, or "usage-restricted band" from the point of view of the existing system. Prohibiting an allocation of the band-in-use to an uplink channel obviates needing to provide a new system terminal with a detector for the interference-report signal, or to perform an operation according to the detection result. Moreover, in the new system, it is necessary to allow operating without using a band designated to be used by the existing system. From these points of view, it is advantageous to use an OFDM modulation scheme. The OFDM modulation scheme is used to make it possible to change frequencies to be used both easily and flexibly. The explanations below assume applying the OFDM modulation scheme.

Embodiment 1

Figure 4:
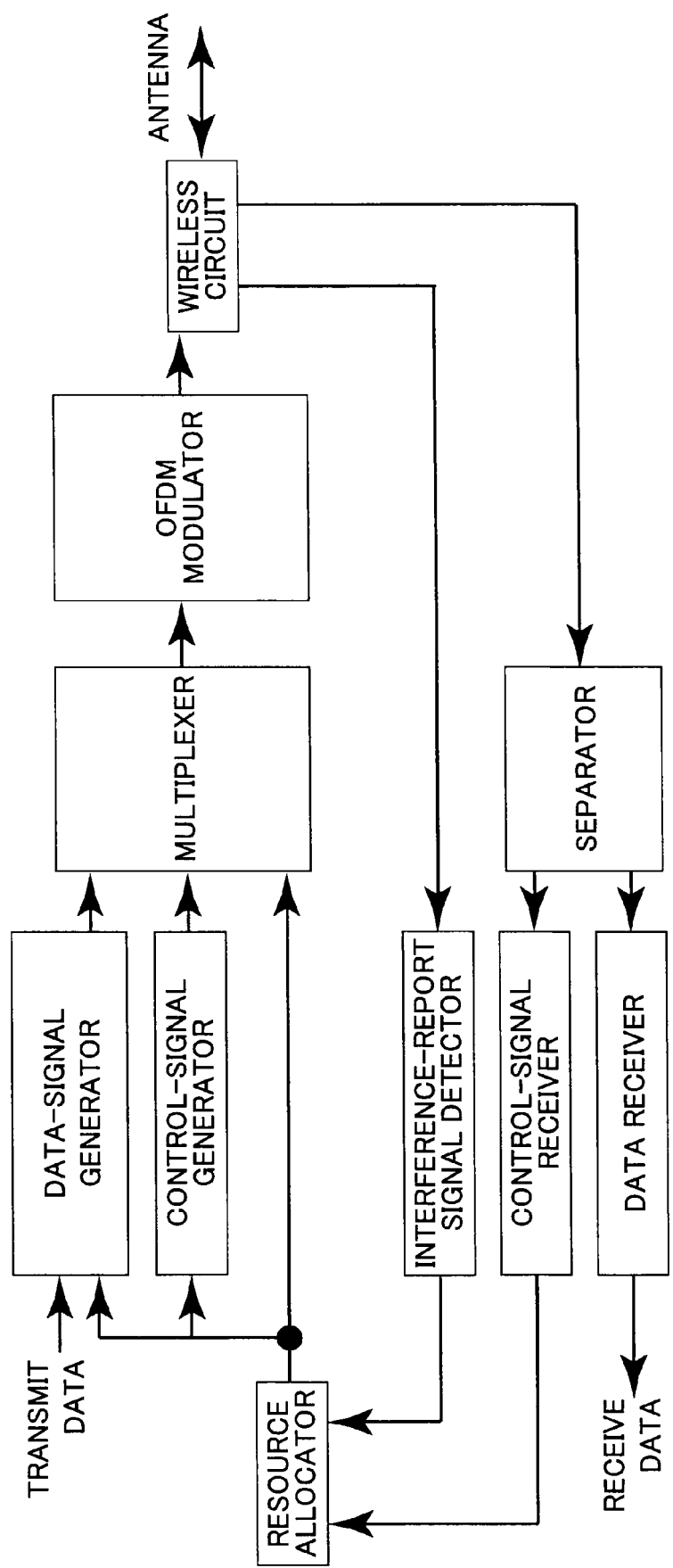
FIG. 4 is a diagram illustrating an exemplary configuration of a base station of a new system.

FIG. 4 is an exemplary configuration of a base station of a new system. A signal received by a wireless circuit as shown on the right is separated into a signal with an interference report signal possibly included, and a new system signal. Then, the signal with the interference report signal possibly included is input into an interference-report signal detector.

If the received signal has an interference report signal included, the interference-report signal detector determines a usage-restricted band from the interference-report signal, and reports the determined result to a resource allocator. As described above, the usage-restricted band is in use by the existing system in actual communications.

The resource allocator allocates uplink and downlink channel resources using a band other than a usage-restricted band. In the band actually used by the existing system, the base station of the new system must ensure that all signals including not only a normal data signal, but also preamble and pilot signals, etc., are not transmitted. The resource allocator may be called a scheduler since it schedules wireless resources. Moreover, the pilot signal may be a reference symbol (RS), a training sequence, a known signal, or any other appropriate signal known prior to communicating.

The data-signal generator generates a transmit signal from input transmit data as well as from information from the resource allocator, and outputs the generated signal to a multiplexer.

The control-signal generator generates, based on system parameters and information from the resource allocator, a control signal to be transmitted, and outputs the control signal to the multiplexer.

The multiplexer multiplexes the input data signal and the control signal based on resource allocation information also input. Moreover, pilot signals are multiplexed.

These signals are input to an OFDM multiplexer at which a time signal to be transmitted is generated. The time signal is input to the wireless circuit, modulated to a transmission frequency, filtered, power amplified, etc., so that a resulting signal is transmitted.

Figure 5:
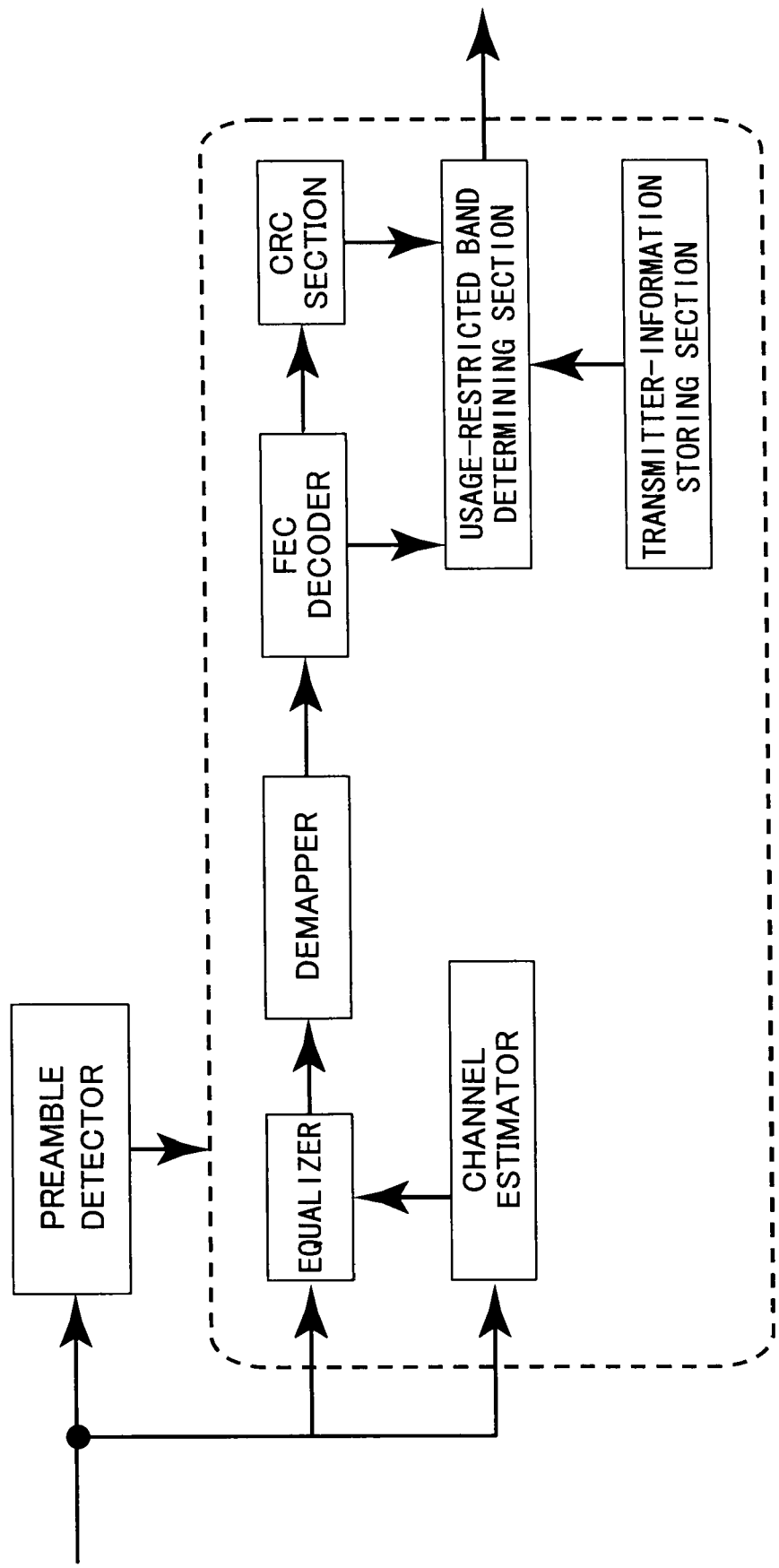
FIG. 5 is a diagram illustrating an exemplary configuration of an interference-report signal detector.
Figure 6:
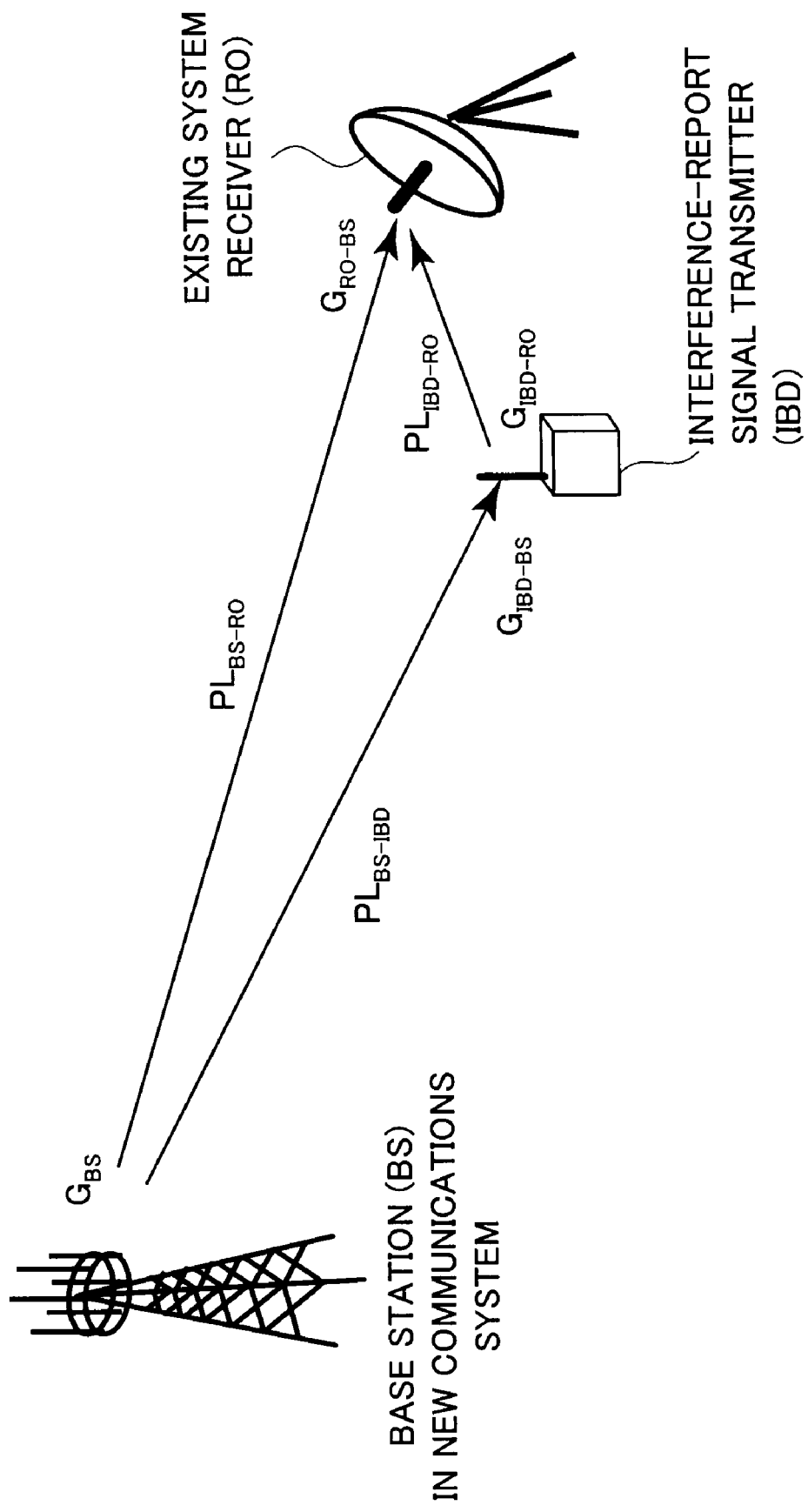
FIG. 6 is a diagram illustrating an exemplary method 1 which synchronizes locally.

FIG. 5 is an exemplary configuration of an interference-report signal detector. A preamble detector determines whether a preamble is included in the received signal. Here, if the signal received as a preamble does not reach a known receive level, the operations below are not performed. When the preamble is detected, the operations of the process as described below are started.

First, a channel is estimated at a channel estimator. Then, a channel estimation value estimated at the channel estimator is used to equalize the received signal at an equalizer. The equalized received signal is input to a demapper at which a receive bit is detected from a receive symbol. The detected sequence of receive bits is error-correction decoded at the following FEC decoder, the result of which decoding is input into the CRC section. At the CRC section, whether an error is included in the input signal sequence is detected. The presence of an error is input to a usage-restricted band determining section.

A transmit power level, and an amount of out-band emission of an own transmitter are set at a transmitter-information storing section and input to the usage-restricted band determining section, and the width of a required guard band may be calculated from these values.

At the usage-restricted band determining section, a band reported by an interference-report signal is set as a usage-restricted band. Here, when an improper interference-report signal is received (for example, when the error-detection result of the CRC is NG) usage of all bands may be restricted.

Example of Numerical Values

Below, a specific example of numerical values is shown to facilitate understanding of the embodiment of the present invention. However, these numerical values are merely exemplary, so that any appropriate numerical values may be used within the scope of the present invention. The calculations below are shown as calculation equations, all with dB as the unit of measure.

(1) The condition for a signal transmitted from a new system base station reaching a level less than or equal to an allowable level at an existing system receiver may be expressed as follows, for example:

$$P_{BS} - BW_{BS} + G_{BS\text{-}RO} - PL_{BS\text{-}RO} + G_{RO\text{-}BS} < NL_{RO} + I/N \quad (A1)$$

Here the respective letters represent the following amounts.

$P_{BS}$: transmit power of the new system base station [dBm]
$BW_{BS}$: bandwidth of a transmit signal of the new system base station [dBHz]
$G_{BS\text{-}RO}$: antenna gain of the new system base station in the direction of the existing system receiver [dB]
$PL_{BS\text{-}RO}$: amount of propagation attenuation between the new system base station and the existing system receiver [dB]
$G_{RO\text{-}BS}$: antenna gain of the existing system receiver in the direction of the new system base station [dB]
$NL_{RO}$: noise level of the existing system receiver [dBm]
I/N: allowable interference-to-noise power ratio [dB]

(2) The condition for a signal transmitted from an interference-report signal transmitting apparatus being received at the new system base station may be expressed as follows, for example.

$$P_{IBD} - BW_{IBD} + G_{IBD\text{-}BS} - PL_{IBD\text{-}BS} + G_{BS\text{-}IBD} + N_{rep} > NL_{BS} + I_{margin} + C/N_{req} \quad (A2)$$

Here the respective letters represent the following amounts.

$P_{IBD}$: transmit power of the interference-report signal transmitting apparatus [dBm].
$BW_{IBD}$: bandwidth of the transmit interference-report signal [dBHz]
$G_{IBD\text{-}BS}$: antenna gain of the interference-report signal transmitting apparatus in the direction of the new system base station [dB]
$PL_{IBD\text{-}BS}$: amount of propagation attenuation between the interference-report signal transmitting apparatus and the new system base station [dB]
$G_{BS\text{-}IBD}$: antenna gain of the new system base station in the direction of the interference-report signal transmitting apparatus [dB]
$NL_{BS}$: new system base station noise level [dBm/Hz]
$I_{margin}$: interference margin [dB]
$C/N_{req}$: required receive-power-to-noise-power-ratio [dB]
$N_{rep}$: number of repetitive transmissions (3) The condition for the signal transmitted from the interference-report signal transmitting apparatus reaching a level less than or equal to an allowable level at the existing system receiver may be expressed as follows, for example.

$$P_{IBD} - ACLR - BW_{IBD} + G_{IBD\text{-}RO} + PL_{IBD\text{-}RO} + G_{RO\text{-}IBD} < NL_{RO} + I/N \quad (A3)$$

Here the respective letters represent the following amounts.

$P_{IBD}$: transmit power of the interference-report signal transmitting apparatus [dBm].
ACLR: adjacent channel leakage power ratio [dB]
$BW_{IBD}$: bandwidth of the interference-report signal [dBHz]
$G_{IBD\text{-}RO}$: antenna gain of the interference-report signal transmitting apparatus in the direction of the existing system receiver [dB]
$PL_{IBD\text{-}RO}$: amount of propagation attenuation between the new system base station and the interference-report signal transmitting apparatus [dB]
$G_{RO\text{-}IBD}$: antenna gain of the existing system receiver in the direction of the interference-report signal transmitting apparatus [dB]
$NL_{RO}$: the existing system receiver noise level [dBm]
I/N: allowable interference-to-noise power ratio [dB]

(4) Below an example is shown of numerical values when a common television receiver is assumed as the existing system receiver under the above conditions.

A path loss required for an interfered amount to satisfy an allowable level is, based on equation (A1), $$P_{BS} - BW_{BS} + G_{BS-RO} + G_{RO-BS} - NL_{RO} - I/N =$$
$$36 - 80 + 15 + 5 - (-166) - (10) = 152 \text{ [dBm/Hz]} < PL_{BS-RO}$$

Here, the values of the respective parameters are shown below.

$P_{BS}$=36 dBm (4 W)
$BW_{BS}$=80 dBHz (100 MHz)
$G_{BS-RO}$=15 dB
$G_{RO-BS}$=5 dB
$NL_{RO}$=−166 dBm
I/N=−10 dB

The transmit power of the interference-report power required for 152 dBm/Hz<$PL_{BS-RO}$ is, assuming PLBS-RO=PLIBD-BS, $$P_{IBD} > NL_{BS} + C/N_{req} + BW_{IBD} - G_{IBD-RO} + PL_{IBD-BS} - G_{RO-IBD} - N_{rep} =$$
$$-170 + 3 + 50 - 10 + 152 - 12 - 12 = 1 \text{ dBm}$$

from equation (A2). Here, the values of the respective parameters are shown below.

$NL_{BS}$=−170 dBm
$CN_{req}$=3 dB
$BW_{IBD}$=50 dBHz (100 kHz)
$G_{IBD-RO}$=10 dB
$G_{BS-IBD}$=12 dB
$N_{rep}$=12 dB Finally, the amount of interference experienced by the existing system receiver when the interference-report signal is transmitted at a transmit power $P_{IBD}$ is $$P_{IBD} - ACLR - BW_{IBD} + G_{IBD-RO} + PL_{BS-IBD} + G_{RO-IBD} =$$
$$1 - 70 - 50 - 5 - 56 - 3 = -183 \text{ dBm/Hz} < -178 = NL_{RO} + I/N,$$

which may be set less than or equal to the allowable level. Here, the values of the respective parameters are shown below.

ACLR: 70 dB
$BW_{IBD}$: 50 dBHz (100 kHz)
$G_{IBD-RO}$: −5 dB
$PL_{BS-IBD}$: −56 dB (assumes approximately 3 meters for interval distance in straight line)
$G_{RO-IBD}$: −3 dB In practice, it is impossible to accurately determine the propagation loss, or the transmit power of the new system base station, for which a sufficient margin may be set.

Embodiment 2

CSMA

Figure 7:
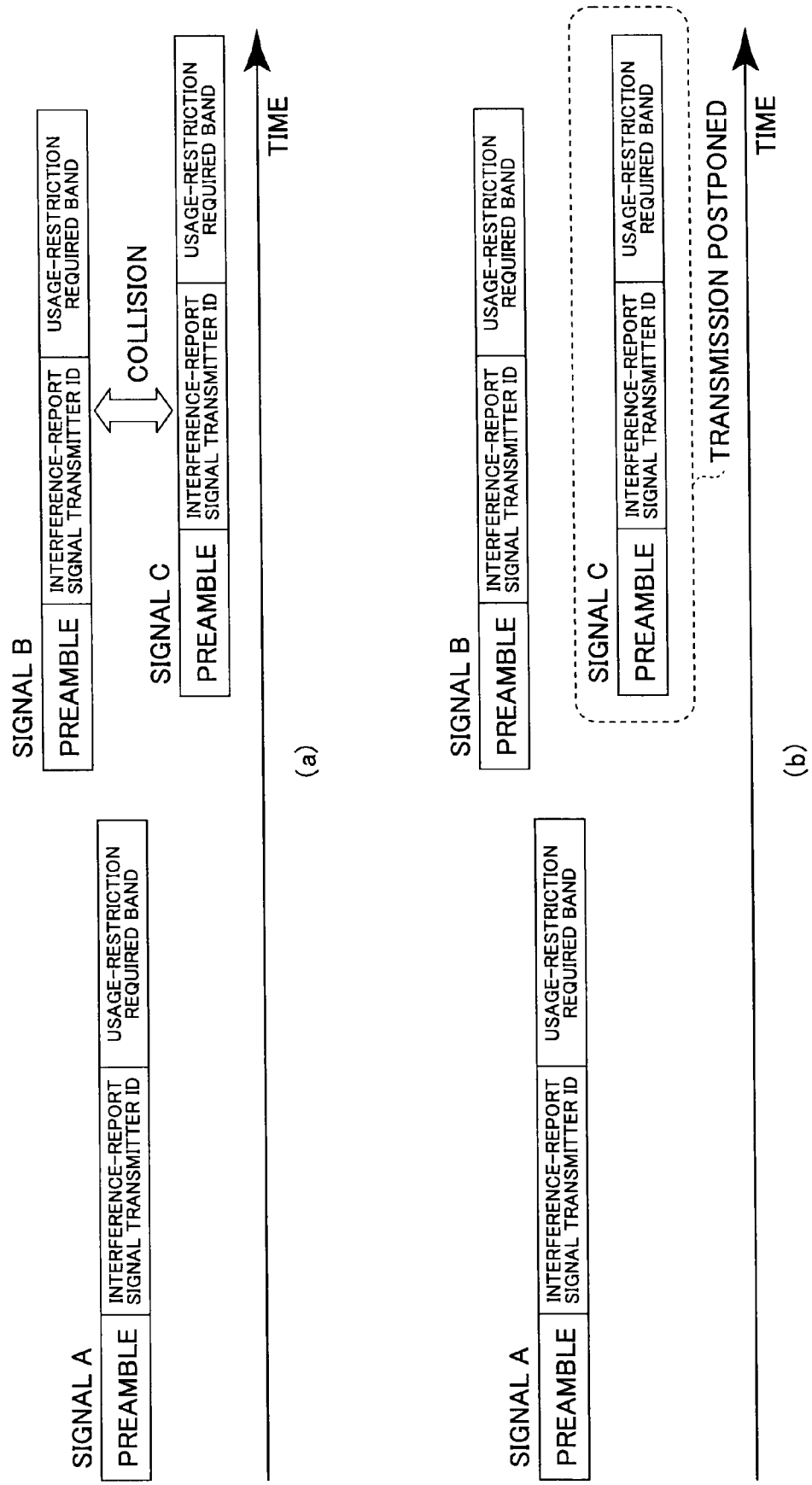
FIG. 7 is a diagram illustrating an exemplary method 2 which synchronizes locally.

In FIG. 7, (a) shows an increased likelihood of collision of interference-report signals with an increased geographical density of the interference-report signal transmitting apparatuses. In the illustrated example, signals B and C collide with each other. With respect to this problem, CSMA/CA, and separating into slots, which are conventionally proposed interference avoidance schemes may be used.

When a CSMA-based method is used, the vicinity is monitored before transmitting a signal such as traffic data, and whether the interference report signal is transmitted in the vicinity is checked. If the interference report signal is transmitted in the vicinity, transmitting of the interference report signal from the own station is postponed until the next opportunity for transmitting ((b) in FIG. 7). On the other hand, if the interference report signal is not transmitted in the vicinity, the interference report signal from the own station is transmitted.

Separating Into Slots

Separating into slots is a method in which the interference-report signal transmitting apparatuses align transmit-start timings of the interference report signals and the receiver uses a signal separating scheme to allow separating simultaneously-received signals into separate signals. Separating into slots requires synchronizing between interference-report signal transmitting apparatuses, which may be performed by GPS, for example. Separating into slots allows avoiding a partial collision, which makes signal separating difficult, and reducing the likelihood of a collision causing an unsuccessful reception. Moreover, as receive timings can be specified to some extent, receiving by the new system base station may also be facilitated.

Furthermore, interference report signals may be periodically transmitted in predetermined periods once a transmission is successful. It may be assumed that these timings for transmissions are reserved and a different interference-report signal transmitting apparatus may start transmitting the interference-report signal at a different timing.

In the present scheme, it suffices to synchronize locally, so that synchronization may be maintained by aligning with the transmit timings of the interference-report signal transmitting apparatuses in the vicinity for transmitting. For synchronizing locally, at least two interference-report signal transmitting apparatuses need to exist in the vicinity. When the number of such apparatuses is less than two, or when no interference report signal from the vicinity is received over a predetermined time period, each terminal may transmit a signal at an arbitrary timing.

Synchronization and CSMA

Moreover, CSMA may be used together with separating into slots. However, when locally synchronizing according to the transmission condition of the interference-report signal in the vicinity, it is necessary to adjust the timings of the interference-report signals, as shown in method 1 or 2. This is because, for separating into slots, it is necessary to set the time to be the transmit timing standard, while for CSMA, backoffs are being randomized.

(Method 1)

Figure 8:
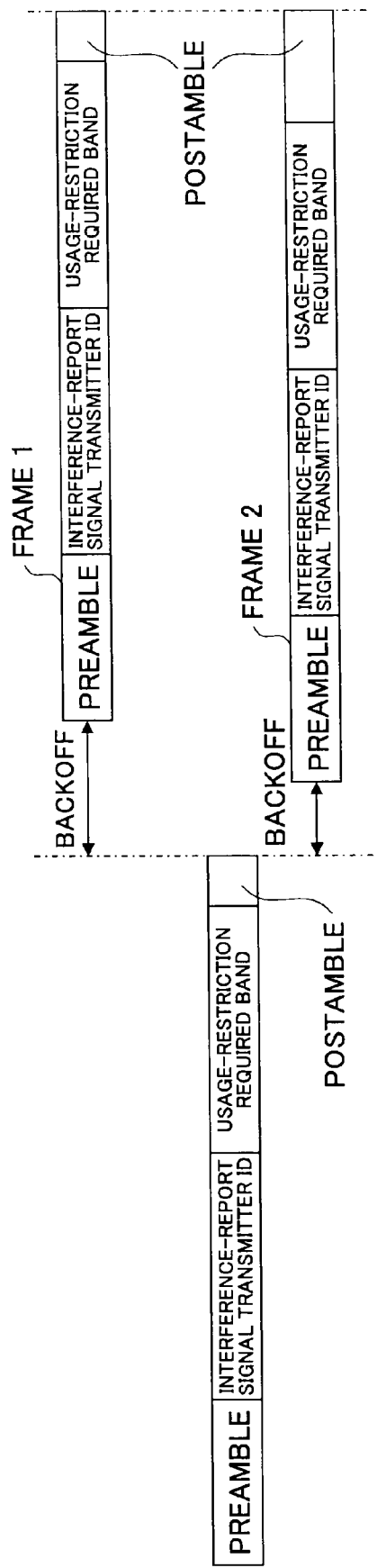
FIG. 8 is a diagram illustrating how both CSMA and separating into slots are used.

As shown in FIG. 8, a postamble is appended to the interference report signal such that the sum of the lengths of the postamble and the backoff become constant. A transmit-start timing is determined with the transmit-end time of the postamble as the standard timing.

(Method 2)

Figure 9:
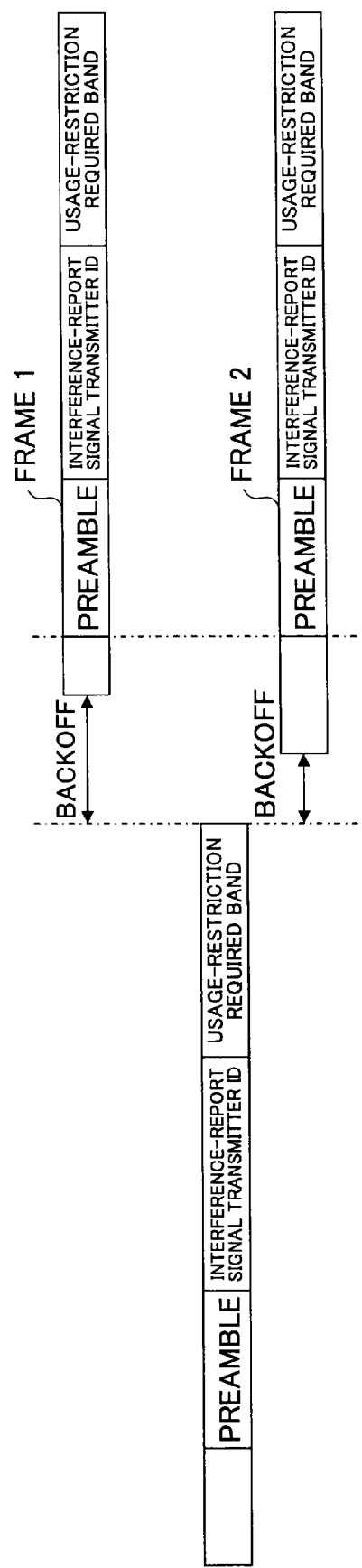
FIG. 9 is a diagram illustrating how both CSMA and separating into slots are used.

As shown in FIG. 9, with the transmit timing of the preamble signal as the standard, a signal reporting the transmit start is transmitted before the preamble. Then, the sum of the lengths of the signal reporting the transmit start and the backoff is maintained constant.

In the two examples as described above, frame 2, of which transmission starts first, obtains the right to be transmitted and is transmitted, with frame 1 to be transmitted at the next opportunity.

For synchronizing locally as described above, there is a possibility of a case of synchronously receiving interference report signals mixed with a case of asynchronously receiving interference-report signals.

In such circumstances as described above, the new system base station may have a synchronous receive mode and an asynchronous receive mode, and operate as follows.

In the synchronous receive mode, the base station specifies a start timing of the next frame as a locally-calculated timing, and starts the frame-receive process as described above upon reaching the start timing of the frame receive. Here, the locally-calculated timing may be corrected with a preamble-detected timing. Moreover, after all signals are detected at the specified timings, replicas of the received signals are created, and the powers of the replicas are subtracted from the powers of the received signals to check the subtracted powers. If synchronization is maintained, the subtracted powers are minimal, but otherwise considerable powers remain. Thus, when the powers are no less than a predetermined value, there is a transition to the asynchronous receive mode.

At all times in the asynchronous receive mode, a correlator for the respective spread codes is operated, and the correlation output is monitored. In the asynchronous receive mode, when interference report signals are received at predetermined timings over a predetermined time period, there will be a transition to the synchronous receive mode. Here the number of specified synchronizing timings may be two or more, as opposed to 1.

Embodiment 3

As the interference-report signals restrict the use of wireless resources by the new system base station, it is not desirable from the point of view of efficiently utilizing frequencies for the interference-report signals to be transmitted more than necessary. Moreover, even in the existing system, it is not desirable from the point of view that the power in the existing system interference-report signal transmitting apparatus is wasted, or the likelihood of collision among the interference-report signals increases.

In the third embodiment of the present invention, the interference-report signal transmitting apparatus transmits an interference-report signal only when a corresponding existing system receiver is in operation, and does not transmit an interference-report signal when it is not in operation. Therefore, the interference-report signal transmitting apparatus requires a function of determining whether the existing system receiver is in operation. This function may be implemented with a method as shown below.

Figure 10:
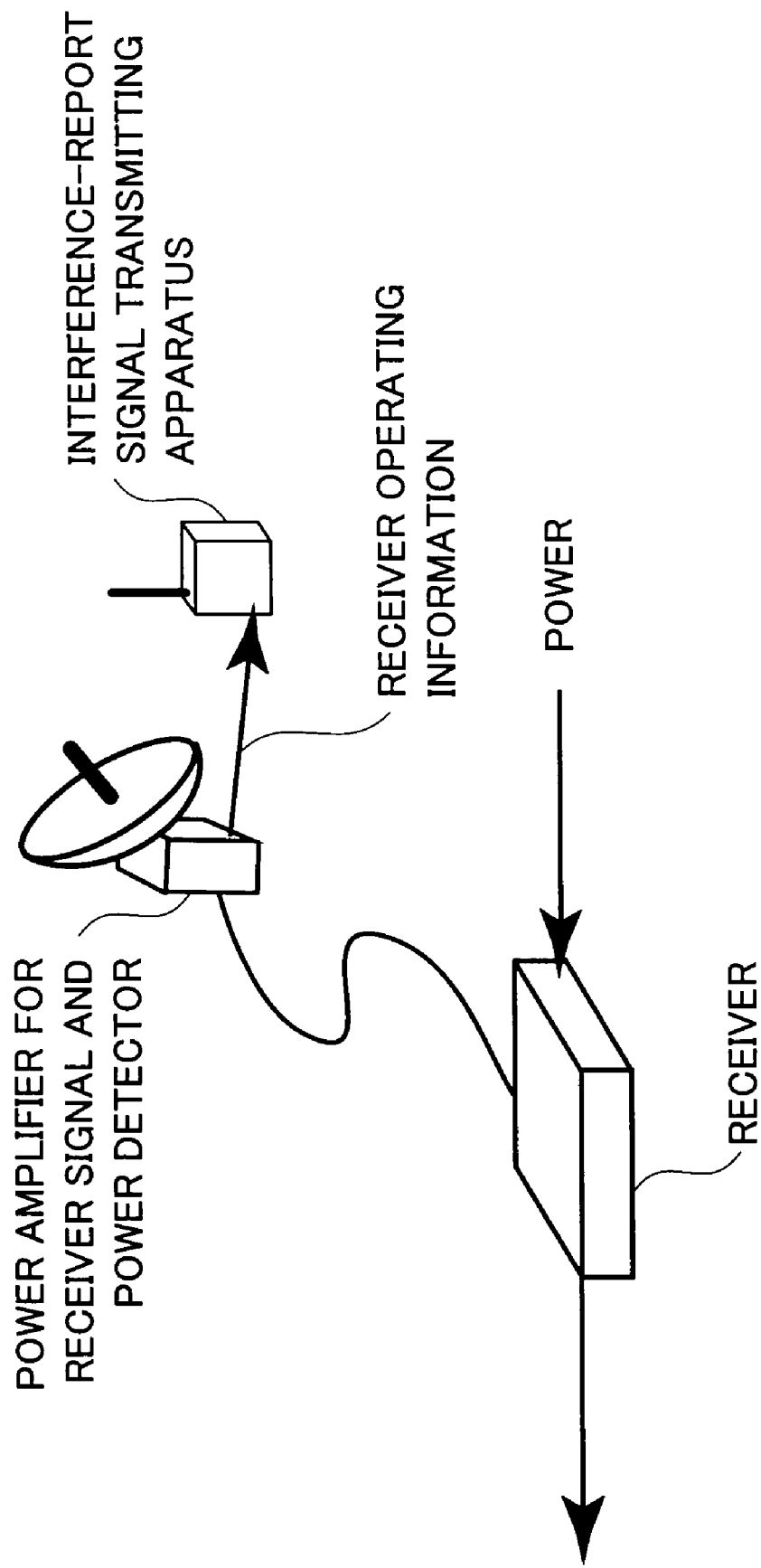
FIG. 10 is a diagram illustrating how the operating condition of the receiver is reported to the interference-report signal transmitting apparatus.
Figure 11:
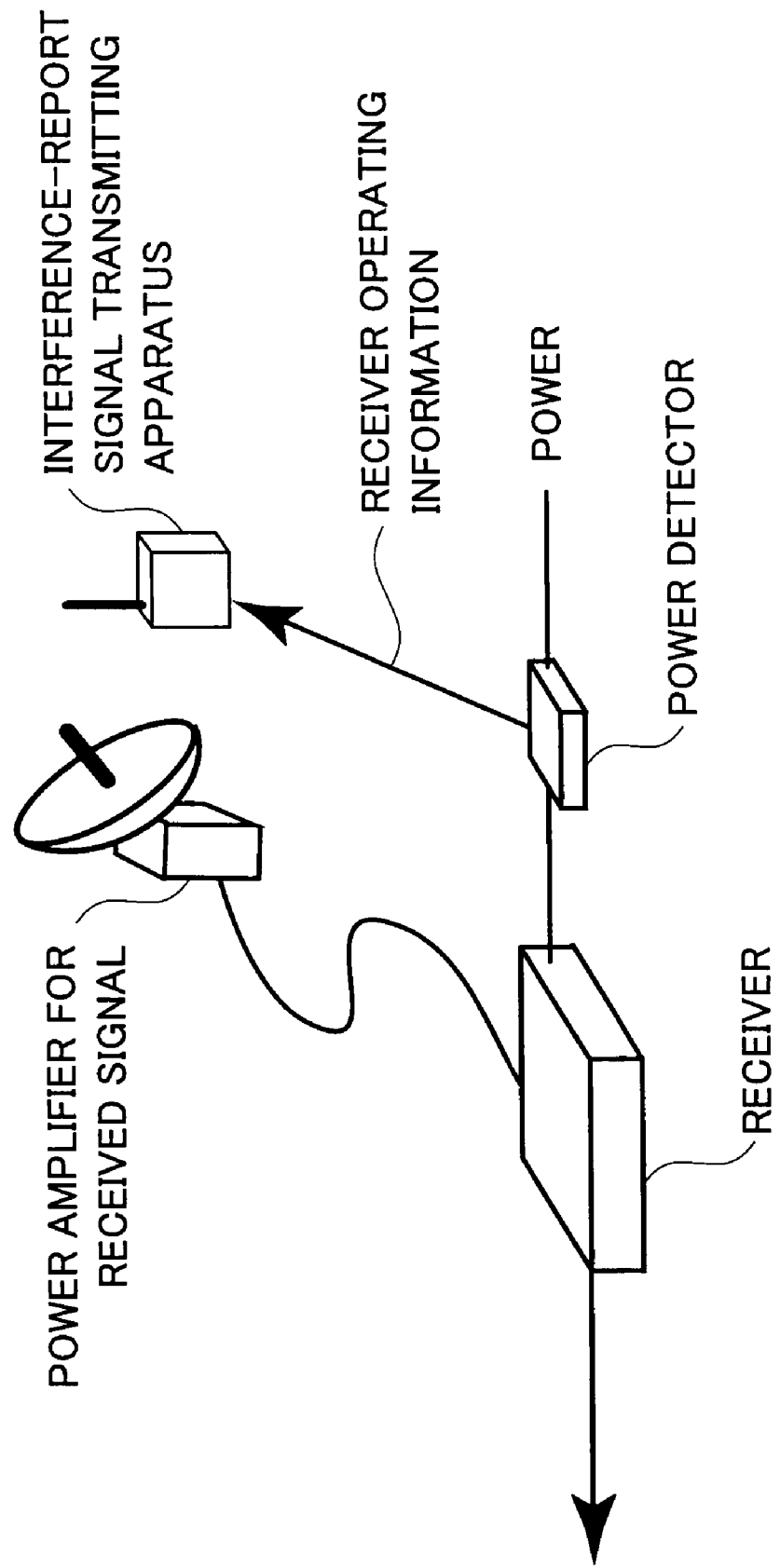
FIG. 11 is a diagram illustrating how the operating condition of the receiver is reported to the interference-report signal transmitting apparatus.

One of the implementation methods is to determine whether the power for the receiver is ON according to the amount of power supplied to the existing system receiver antenna (FIG. 10), or according to the amount of power being supplied to the tuner (FIG. 11).

When measuring a power level supplied to tuners, the equipment units do not necessarily have constant consumed power levels even during operation. Thus, the threshold value of the power level is set between the maximum value of the standby power and the minimum value of the minimum power when used. The threshold value may be determined manually or dynamically. Moreover, a time-averaged value rather than the instantaneous power level may be used for determining. Furthermore, when the tuner power is turned ON, whether it is turned OFF may be determined every predetermined time period rather than continuously.

Now, when the existing system is a broadcasting system, in general, many broadcasting channels are simultaneously transmitted in parallel, of which the existing system receiver receives one (possibly two or more). These broadcasting channels are separately transmitted as bands A, B, C, etc., in frequency-division multiplexing.

Figure 12:
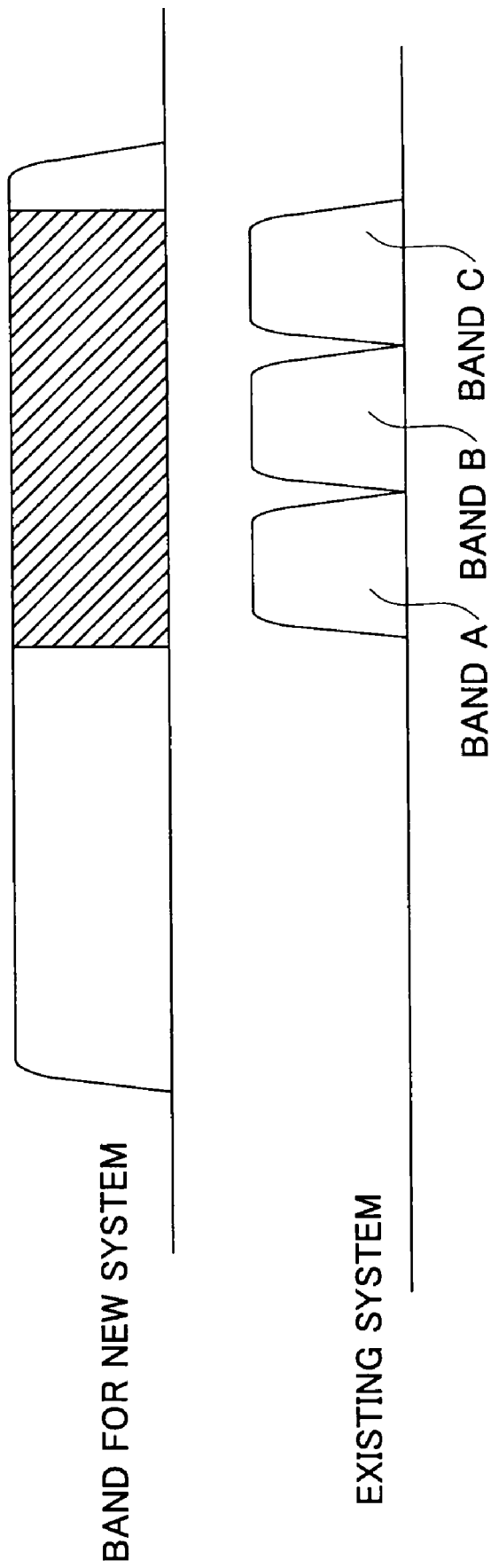
FIG. 12 is a diagram illustrating how a band is restricted based on the operating condition of the receiver.

The above-described method, which is based on the operating states (ON/OFF) of the existing system receiver, is advantageous in that it is able to implement an interference-report signal transmitting apparatus more easily relative to an existing system receiver, which is manufactured without taking into account at all the interference reporting of the present invention. However, as only existing system receiver ON/OFF states are taken into account, none of the bands with a likelihood of being used by the existing system receiver will be used by the new system (FIG. 12).

Figure 13:
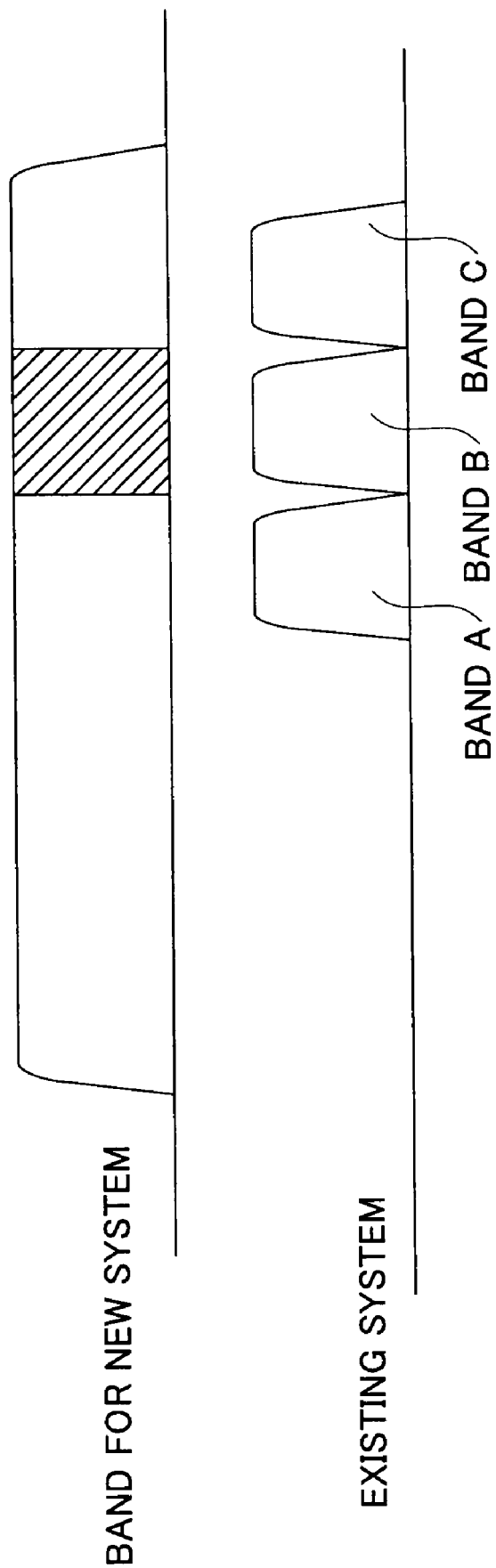
FIG. 13 is a diagram illustrating how a band is restricted based on a band-in-use of the operating receiver.

Paying attention to the difference in frequency bands of the broadcasting channels, only individual frequency bands over which existing system receivers receive are restricted at each moment in time by the new system to further improve the efficiency of frequency utilization (FIG. 13). In FIG. 13, it is recognized that only band B is actually used, and also bands A and C are not used by the existing system.

For restricting only a band (band B in FIG. 13) received by an existing system receiver corresponding to an interference-report signal transmitting apparatus, the interference-report signal transmitting apparatus may be operated as follows. In other words, while the existing system receiver is in operation, the currently-received band may be reported to the interference-report signal transmitting apparatus, or when a user starts using and making a switch from one broadcasting channel to another, the broadcasting channel switched to is reported to the interference-signal reporting apparatus, which specifies the currently-used band. Then, an interference-report signal is transmitted such that only this band is usage restricted.

Moreover, even for simultaneously receiving two broadcasting channels, use of bands corresponding to the currently-received two broadcasting channels may be prohibited.

Moreover, in general, multiple bands are provided not just in a broadcasting system but also in a communications system, and a terminal communicates using one of the bands, so that the above method may be applied.

Embodiment 4

Figure 14:
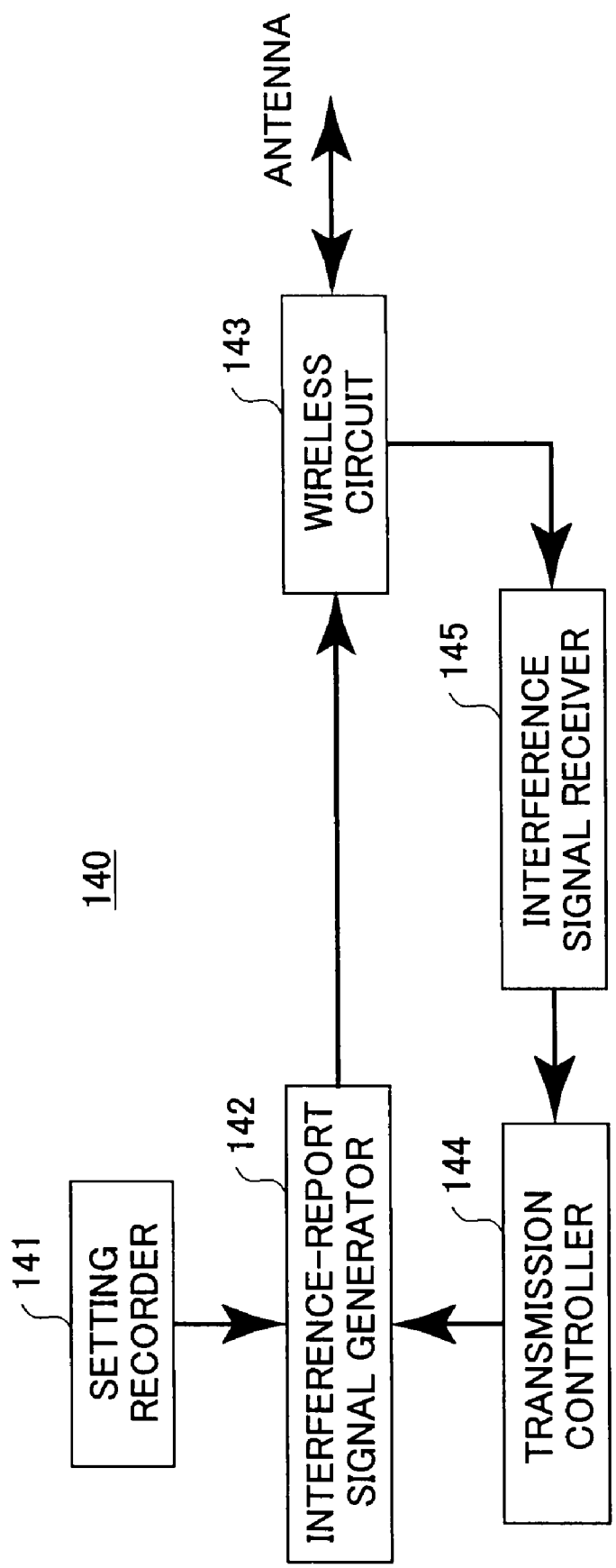
FIG. 14 is a diagram illustrating the interference-report signal transmitting apparatus used in Embodiment 4.

The fourth embodiment of the present invention seeks to make reporting of the interference signal more efficient. FIG. 14 shows a schematic block diagram of an interference-report signal transmitting apparatus 140 according to the fourth embodiment of the present invention. A setting recorder 141 stores usage-restriction required bands, etc., and is connected to the interference-report signal generator 142. A wireless circuit 143 is connected to an antenna, an interference signal receiver 145, and the interference-report signal generator 142. The wireless circuit 143 amplifies wireless signals received from the antenna, and sends the received signals to the interference signal receiver 145. The interference signal receiver 145 amplifies a signal of a band to be monitored out of the received signals, and transmits the amplified signal. The interference-report signal generator 142 generates a transmit interference-report signal based on a transmission controller 144 and the setting recorder 141, and sends the generated signal to the wireless circuit 143. The wireless circuit 143 modulates the signal to be transmitted to a predetermined frequency, and transmits the modulated signal.

In the interference-report signal transmitting apparatus, an interference report signal is transmitted only when an interference signal is received. Here, whether the interference signal is received is determined by measuring not just the interference-signal receive power in a frequency band presently used by the existing system receiver, but also the interference-signal receive power in the frequency band for the whole new system.

Figure 15:
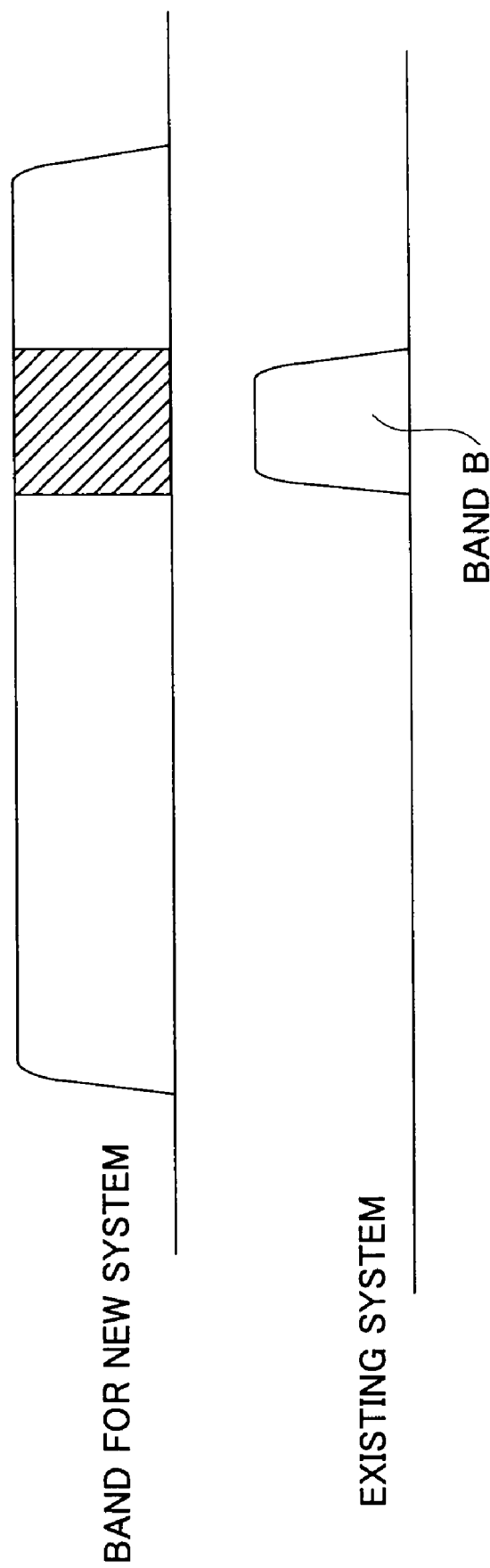
FIG. 15 is a diagram illustrating a band for a new system and a band in use by an existing system.

As shown in FIG. 15, assume that the interference-report signal transmitting apparatus monitors only a frequency band B, which is received by the existing system receiver. In this case, the following circumstances are possible:

1. Interference-report signal transmission is reported to the new system base station.
2. The new system base station stops transmitting over a band specified by the interference-report signal (the frequency band B).
3. In a usage-restricted band A, receiving the interference signal stops. As a result, the interference-report signal transmitting apparatus stops transmitting the interference-report signal.
4. The new system base station does not receive an interference-report signal which prohibits using the usage-restricted band B, and, thus, a usage-restricted band A is used to resume transmitting.
5. The interference-report signal transmitting apparatus detects interference occurring in the usage-restricted band B, and retransmits the interference-report signal to the new system base station.

In this way, the existing system receiver may receive interference periodically in the usage-restricted band A due to inefficient transmission of the interference report signal.

The fourth embodiment seeks to deal with such a problem as described above. Received signals not only in the band presently received by the existing system receiver, but also in the other bands are included in signals to be monitored. In this way, it is made possible to determine whether a new system transmitter-receiver exists (conducts communications) in the vicinity of the existing system. If the new system transmitter-receiver exists, an interference report signal requesting to prohibit the use of a band used for receiving by the existing system receiver is periodically transmitted to the new system base station even when there is no interference signal in the band, to deal with the problem as described above.

Furthermore, the interference-report signal transmitting apparatus may be set to be able to recognize the interference level to adaptively determine the transmit output and the spreading factor of the interference-report signal. For example, a predetermined level or spreading factor is used for initial transmission, but when the received interference signal level remains above the allowable level, the transmit power may be increased or the spreading factor may be increased for transmitting.

Moreover, the interference-report signal transmitting apparatus may measure the interference level, or the existing system receiver may measure the interference level and report the measured level to the interference-report signal transmitting apparatus.

There may be a likelihood of interference when a mobile terminal belonging to the new system that has moved from outside the area the interference report signal can reach starts a new transmission.

This problem may be overcome by providing the mobile terminal with a provisional transmission period as described below in Embodiment 7. The mobile terminal intending to transmit a data signal transmits a signal in advance in this provisional transmission period. The signal in this provisional transmission period may involve a frequency band not used by the existing system receiver or a frequency band used by the existing system receiver, or may be transmitted in a time frame provided in advance that is not used by the existing system receiver. In the provisional transmission period, an existing system receiver may monitor the frequency band for a signal and determine whether to transmit the interference-report signal according to whether a signal is transmitted in this provisional transmission period.

Embodiment 5

The number of interference-report signal transmitting apparatuses may be only one, or more than one. Embodiment 5 of the present invention relates to efficiently reporting interference-report signals to a new system when there are multiple interference-report signal transmitting apparatuses. For example, assume that there are two interference-report signal transmitting apparatuses A and B, and one new system base station C. If interference report signals provided by the interference-report signal transmitting apparatuses A and B were the same, it would not be efficient to separately report the signals to the new system base station. Therefore, if the interference report signal transmitted from the interference-report signal transmitting apparatus A, which is received by the interference-report signal transmitting apparatus B, indicates the same band as the band to be reported by the interference-report signal transmitting apparatus B, the interference-report signal transmitting apparatus B may choose not to transmit an interference-report signal. With this scheme, depending on the positional relationship between the interference-report signal transmitting apparatus and the new system base station, a non-negligible interference may occur in the existing system.

Figure 16:
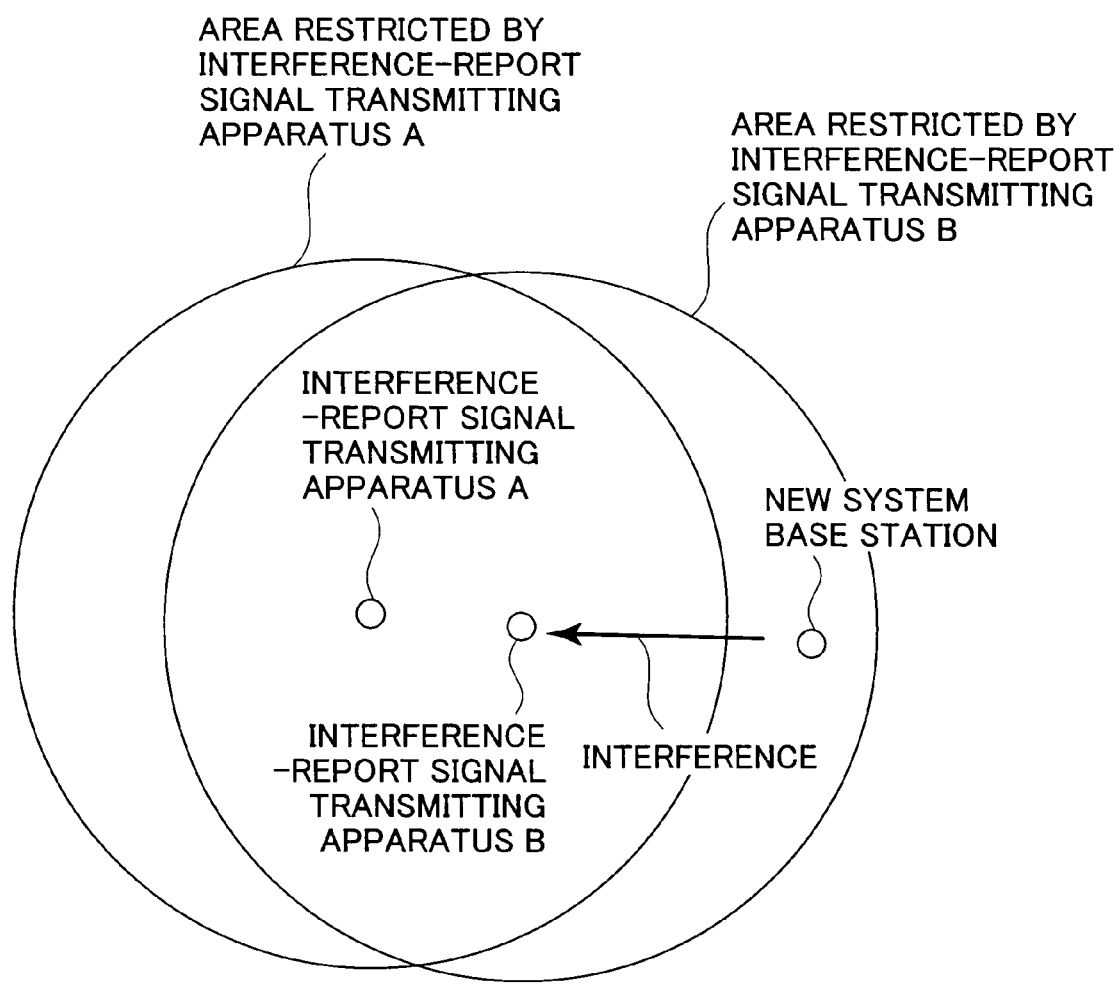
FIG. 16 is a diagram illustrating positional relationship of the interference-report signal transmitting apparatuses and a new system base station.

As shown in FIG. 16, assume there are two interference-report signal transmitting apparatuses and one new system base station. Assume that the new system base station cannot receive an interference-report signal from the interference-report signal transmitting apparatus A, but can receive an interference-report signal from the interference-report signal transmitting apparatus B. As the above-described operation, assume that, if the interference-report signal from the interference-report signal transmitting apparatus B indicates the same band X as the band to be reported by the interference-report signal transmitting apparatus B, the interference-report signal transmitting apparatus B chooses not to transmit an interference-report signal. In this case, the new system base station C would not receive an interference-report signal, and may conduct some communications using the band X. As a result, interference from the new system may occur in the band X.

Embodiment 5 of the present invention deals with such a problem as described above. The interference-report signal transmitting apparatus B checks the receive level of the interference-report signal received from the interference-report signal transmitting apparatus A. If the receive level is high, the interference-report signal transmitting apparatus B does not transmit an interference report signal. If the receive level is low, the interference-report signal transmitting apparatus B transmits an interference-report signal. The receive level may be compared with a predetermined threshold value to determine the relative receive level. Whether to transmit an interference report signal from an own apparatus may be determined from the relative receive levels of the interference-report signals from other apparatuses to effectively deal with the problem as described above. When the interference-report signal transmitting apparatus A is relatively close to the interference-report signal transmitting apparatus B, the interference-report signal transmitting apparatus B refrains from transmitting an interference-report signal. An interference-report signal is transmitted from an interference-report signal transmitting apparatus B only when the apparatuses are considerably apart.

Moreover, the interference-report signal transmitting apparatus B may determine whether to transmit the interference-report signal by taking into account the receive level of the interference signal as well. For example, if the receive level of an interference-report signal received from another apparatus A is low, and the interference level at an own apparatus B is high, an interference-report signal may be transmitted, and may be not transmitted otherwise. For example, if the interference-report signal transmitting apparatus B is far apart from the new system base station C and the interference level from the new system is low in the case as shown in FIG. 16, the interference-report signal transmitting apparatus B may be set not to transmit an interference report signal. This makes it possible to limit restriction of bands used by the new system only to those which are truly necessary, while also limiting transmission of interference-report signals only to those which are truly necessary.

Figure 17:
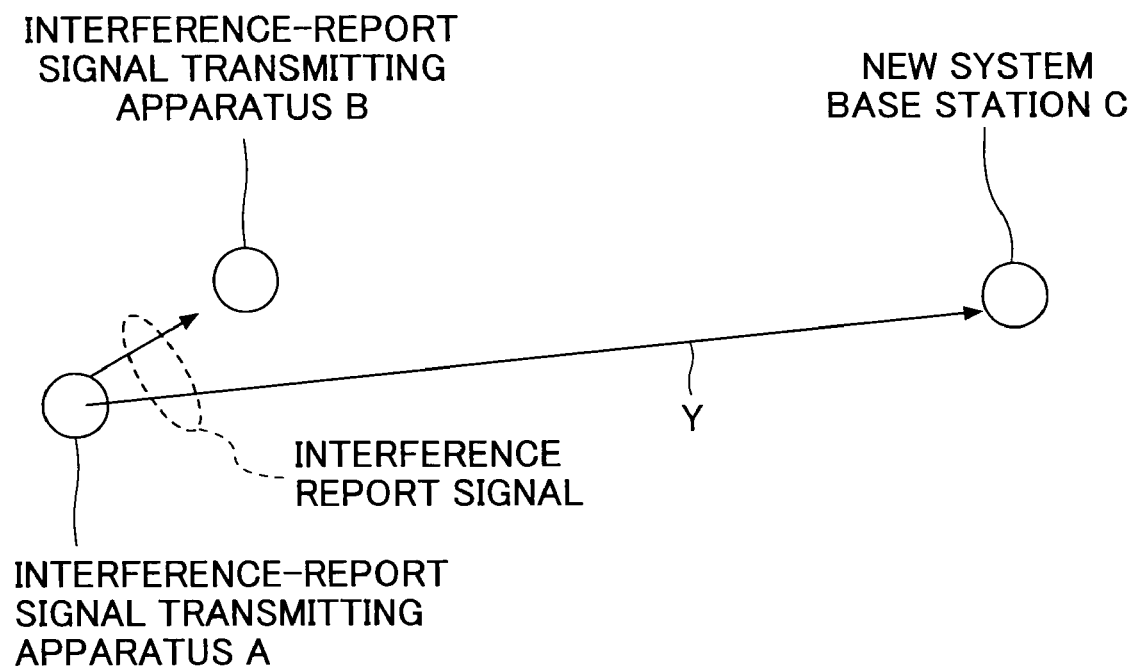
FIG. 17 is a diagram illustrating an arrangement of interference-report signal transmitting apparatuses A, B and a new system base station C.
Figure 18:
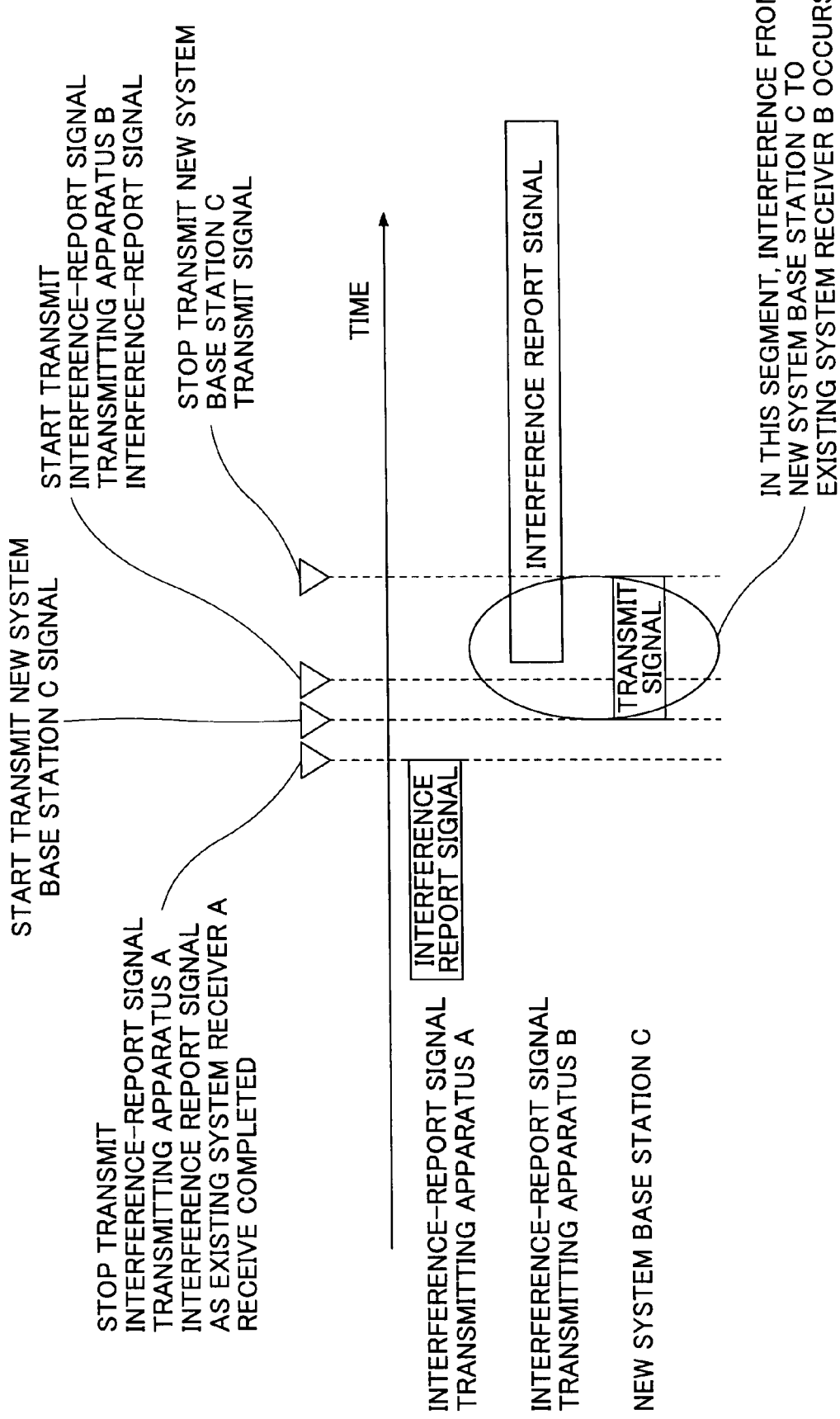
FIG. 18 is a diagram illustrating occurrence of interference due to a neighboring interference-report signal transmitting apparatus interference report signal stopping.

As shown in FIG. 17, if the interference-report signal transmitting apparatus B refrains from transmitting an interference-report signal as the interference-report signal transmitting apparatus A has already transmitted the interference-report signal Y with respect to a usage-restricted band X not shown, the following circumstance may be possible. Even if the transmission of the interference-report signal Y from the interference-report signal transmitting apparatus A stops, as the existing system continues to use the band X, the interference-report signal transmitting apparatus B, which has refrained from transmitting an interference-report signal, may have to start transmitting an interference-report signal, before which the new system base station C may have started transmitting. In other words, a signal may be transmitted from the new system base station C before the interference-report signal transmitting apparatus B transmits an interference-report signal as shown in FIG. 18, and as a result, interference from the new system base station C may occur in the band X.

Figure 19:
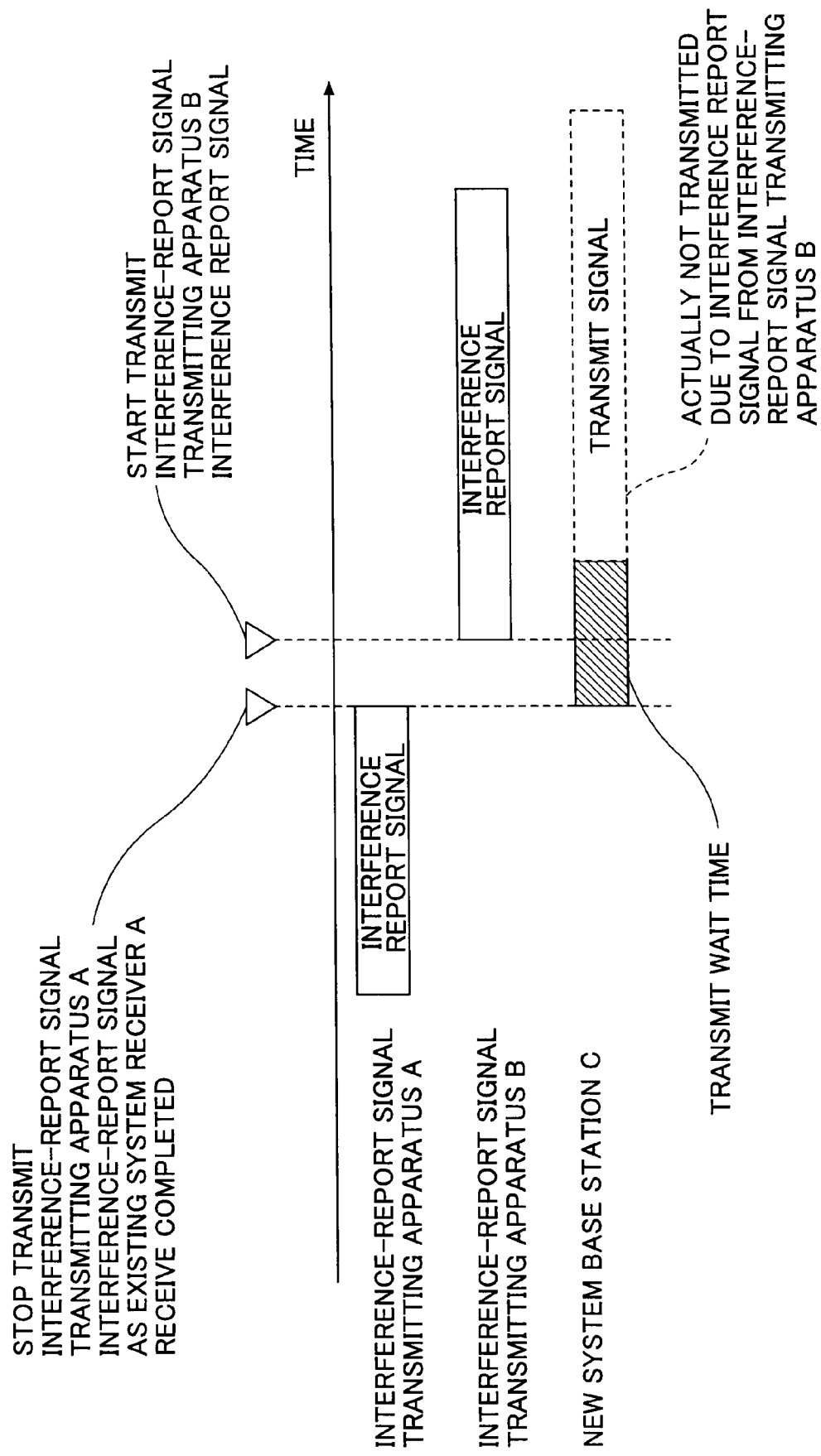
FIG. 19 is a diagram illustrating resolution of the occurrence of the interference due to an interference-report signal transmitting apparatus interference report signal stopping.

In order to deal with the problem as described above, as shown in FIG. 19, the interference-report signal transmitting apparatus B may monitor at all times the interference-report signal Y, which is sent from the neighboring interference-report signal transmitting apparatus A, and after reception of the interference-report signal Y stops, the new system base station C may wait a predetermined period ("transmit wait period" in FIG. 19) and then transition to the operation of starting transmission of a signal. In this way, the interference-report signal transmitting apparatus B can transmit the interference-report signal before the new system base station C starts signal transmission, while the existing system can continue receiving the desired signal without receiving interference from the new system base station C in the band X.

Embodiment 6

In the respective embodiments as described above, an interference-report signal transmitting apparatus which is different from the new system base station generates and transmits an interference-report signal. However, the present invention is not limited to such form, so that, for example, the new system base station may itself determine whether the band can be used, or generate and transmit an interference-report signal. The new system base station is provided with such functions as described above to reduce the number of interference-report signals (and reduce collision) when the geographic arrangement density and the utilization rate of the interference-report signal transmitting apparatuses are high, efficiently utilizing the frequencies by the new and old systems.

First, assume that the interference-report signal transmitting apparatuses (e.g., A and B in FIG. 16) as described in the above embodiment coexist with the new system base station of the present embodiment. The base station in the present embodiment reports as a restricted-band report signal a band (usage-restricted band X), the use of which is refrained in areas of the base station based on the current interference-report status, and information set in advance. The new system uses a band other than the use restricted band X. If the band X, which is actually used by the existing system, is included in the usage-restricted band, an interference-report signal requesting to prohibit the use of the band X is not transmitted. This is because reporting has already been made with the restricted-band report signal from the new system base station. On the other hand, if the band which is actually used by the existing system is not included in the usage-restricted band, the interference-report signal transmitting apparatus transmits an interference-report signal.

In the present embodiment, the interference-report transmitting apparatus operates as follows.

1. It is determined whether an interference-report signal requesting to prohibit the use of the band X, which is actually used by the existing system, has been transmitted. The operating mode may be determined according to whether a restricted-band report signal has been received from the new system base station.

2. If the operating mode of the base station is not a restricted-band report mode, the operation as described in the above embodiment is performed, and the interference-report signal is transmitted.

3. If the operating mode of the base station is the restricted-band report mode, the interference-report signal transmitting apparatus analyzes the restricted-band report signal from the new system base station, and specifies the band for which use by the new system is refrained. It is determined whether the band applies to a band for which prohibiting has been requested by the interference-report signal transmitting apparatus. If no, the interference-report signal transmitting apparatus performs the above-described operations, and transmits the interference-report signal. If yes, the interference-report signal transmitting apparatus does not transmit the interference-report signal.

Figure 20:
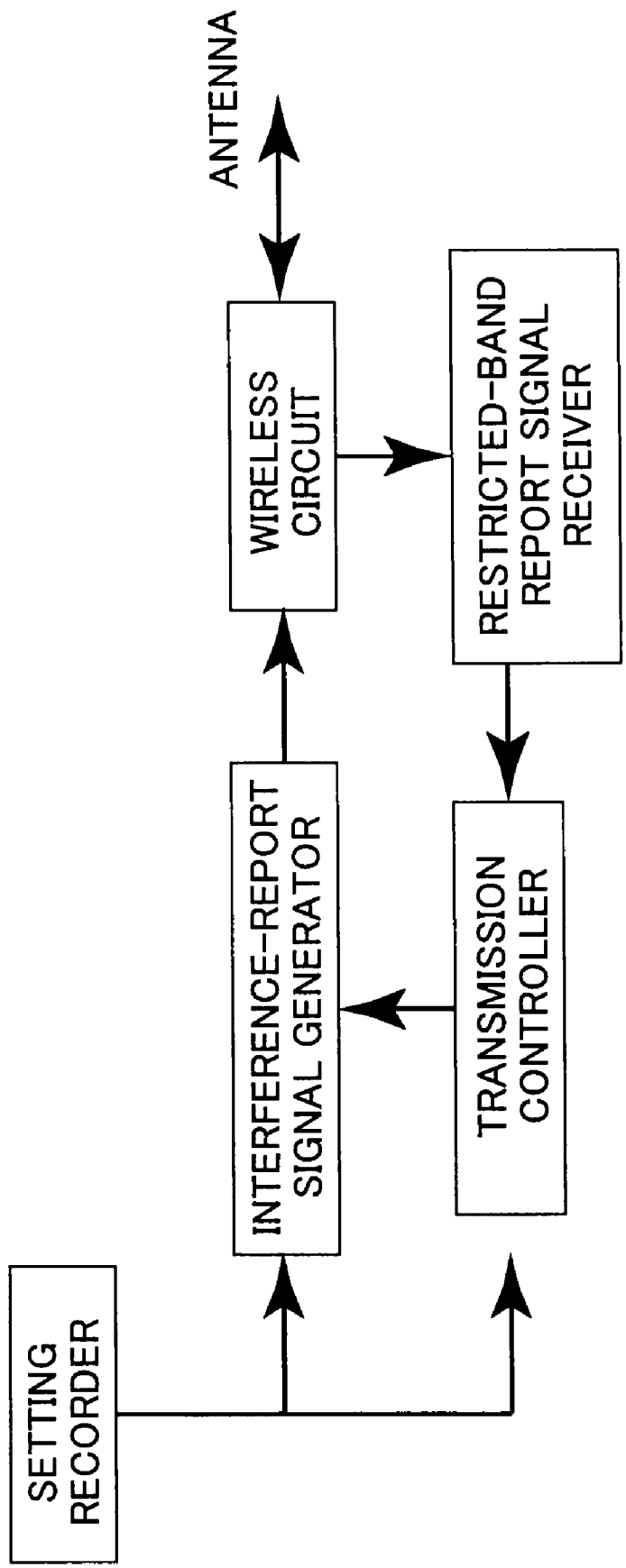
FIG. 20 is a diagram illustrating an exemplary configuration of the interference-report signal transmitting apparatus.

FIG. 20 shows an exemplary configuration of an interference-report signal transmitting apparatus used in the present embodiment.

A restricted-band report signal receiver receives a restricted-band report signal transmitted from the new system base station, checks the presence and the contents of the restricted-band report signal, and reports the result to a transmission controller.

The restricted-band report signal transmission may involve a dedicated band, or the same band as the interference-report signal.

The transmission controller determines the necessity of transmitting the interference-report signal and controls the operation of the interference-report signal generator based on information input from the restricted band-report signal receiver and information from a setting storing unit.

In the present embodiment, the new system base station (or the new system terminal) needs to perform the following operations in addition to the above operations.

1. Determining the necessity of transitioning to the restricted-band report mode 2. Stopping restricted-band allocation 3. Reporting a band restriction-report signal (interference report signal) to a base station and/or interference-report signal transmitting apparatus in the vicinity 4. Check for an event of switching between operating modes (for example, determine the end of the restricted-band report mode)

When to start the restricted-band report mode may be determined according to the following determination criteria, for example.

Frequency band and timing for starting restricted-band report mode are manually determined in advance.

Determination is made according to the transmission conditions (number of sources, transmission period, etc.) of the detected interference-report signals.

Determination is made according to the frequency of collision of the detected interference-report signals.

Determination is made according to the system workload of the new system.

Determining when to terminate the restricted-band report mode may be disabled a predetermined period after the start of the restricted-band report mode, for instance. However, with this method, the restricted-band report mode may be set for an unnecessarily long time. In addition, if the restricted-band report mode is set for a short time on the contrary, the number of times the start and completion operations of the restricted-band report mode are executed may become large. This is because, during the restricted-band report mode, the interference-report signal related to the band is not transmitted from the interference-report signal transmitting apparatus during the restricted-band report mode, so that it is not possible to properly determine the operating condition of the existing system, and to properly determine the timing of mode switching.

From the point of view of dealing with these concerns, even when the new system base station is in the restricted-band report mode, the interference-report signals may be transmitted from the interference-report signal transmitting apparatus at constant intervals. The constant intervals in this case should be longer than an interval during which a normal interference report signal is transmitted. The constant intervals need to be set taking into account an interval for determining a timing of disabling the restricted-band report mode at the base station. In addition, with respect to the constant intervals, if a signal, which is transmitted from an interference-report signal transmitting apparatus A in the vicinity of the interference-report signal transmitting apparatus B that is different from B, requests prohibiting the use of a band which is the same as what is actually used by the interference-report signal transmitting apparatus B, transmission may be made from the interference-report signal transmitting apparatus B in a predetermined period after the transmit time of the signal. Determinations of the interference-report signal transmitting apparatus in the vicinity may be made using the method as described above. Moreover, the constant intervals may be reported by the base station. In this case, a function of analyzing the contents of the restricted-band report signal as well as a function of receiving this report signal is required for the interference-report signal transmitting apparatus.

Moreover, the interference-report signal transmitting apparatus may transmit interference report signals not in constant intervals during the restricted-band report mode, but aperiodically or as needed. For example, the new system base station may transmit a signal "prompting an interference report signal for a restricted band", according to which signal the respective interference-report signal transmitting apparatus may transmit an interference-report signal. Here, in order for the interference-report signal transmitting apparatus to determine the operating condition of the new system terminal in the vicinity, checking may be performed by finding out the receive signal level in a band other than a restricted band as described above.

While the restricted-band report signal may be transmitted by an apparatus other than the base station, it is desirable to be transmitted by the new system base station.

Figure 21:
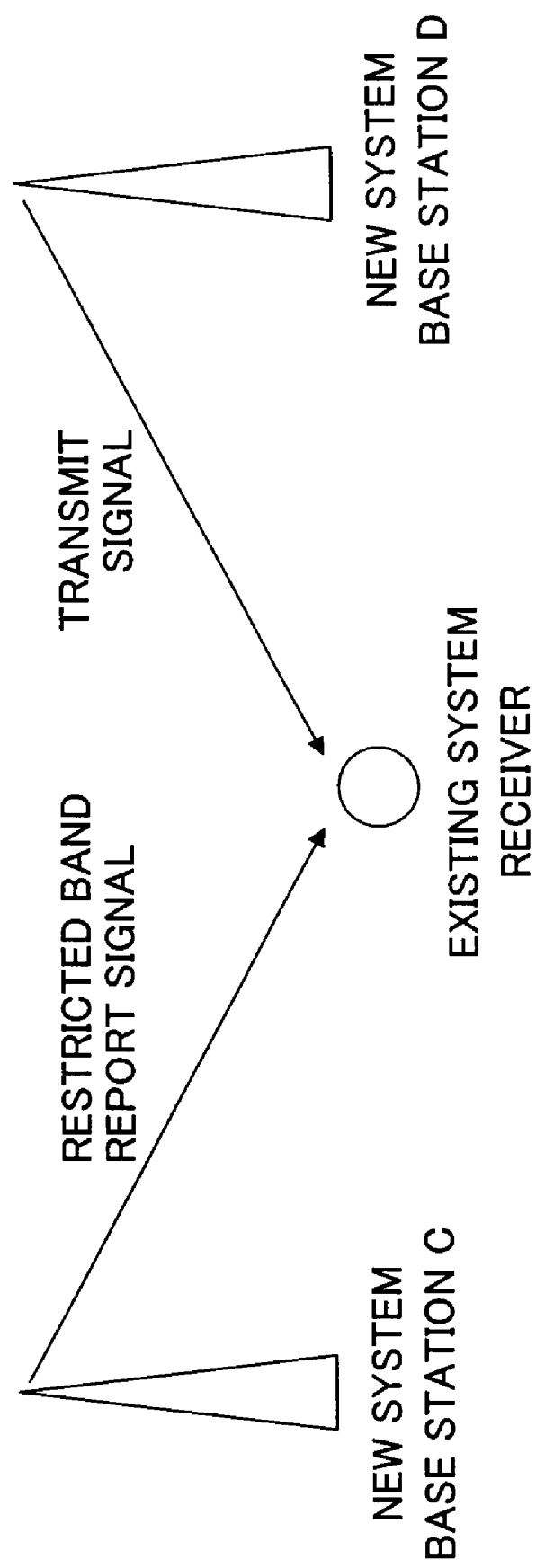
FIG. 21 is a diagram illustrating an arrangement of new system base stations C, D, and an existing system receiver.

In Embodiment 7, as shown in FIG. 21, a signal may be transmitted from a new system base station D, which is different from the new system base station C, which transmitted the restricted-band report signal as shown in FIG. 21. In other words, as shown in FIG. 22, in the period such that the new system base station C emits the restricted-band report signal, a signal may also be emitted from the new system base station D.

Approaches to deal with such problem as described above include the following. In other words, as shown in FIG. 23, a certain provisional transmission period may be provided. The new system base station D to transmit a signal transmits a signal in advance in this provisional transmission period. The signal transmission in this provisional transmission period may involve a frequency band not used by the existing system receiver, or a frequency band used by the existing system receiver, or may be transmitted in a time frame provided in advance that is not used by the existing system receiver. In the provisional transmission period, the existing system receiver may monitor the frequency band for a signal and determine whether to transmit an interference-report signal according to whether a signal is transmitted in this provisional transmission period. In this way, signal transmission from the new system base station D after the provisional transmission period may be prevented, avoiding interference.

Embodiment 7

When a certain interference-report signal transmitting apparatus transmits an interference-report signal simultaneously with a different interference-report signal transmitting apparatus in the vicinity transmitting an interference-report signal, the signals collide (mutually interfere). The collision also occurs between an interference-report signal and a restricted-band report signal emitted from a new system. Below a collision between interference-report signals is described as an example. Detecting an interference-report signal may not be correctly detected. In the above, an approach which reduces the likelihood of the interference-report signals colliding is described. In Embodiment 7 of the present invention, the likelihood of being able to receive the interference-report signals correctly may be increased even after the interference-report signals collide. Therefore, the interference-report signals are spread for transmission. As an example, the spread code used here may be selected as follows:

Select Randomly

Detect spread codes used in the vicinity, and use unused codes.

Detect spread codes used in the vicinity, and select codes taking into account a band X for which the own apparatus requests a usage restriction, and a band Y for which prohibited use is required in the vicinity. Details are shown below.

Moreover, as described above, transmit timings are standardized, so that once transmission succeeds, the spread code may be selected as follows when the same signals are transmitted in constant intervals.

FIG. 24 is an interference-report signal transmitting apparatus 240, which is used in Embodiment 7 of the present invention. The interference-report signal transmitting apparatus 240 detects spread codes used in the vicinity of the own apparatus, and determines the spread codes to be used. In the present embodiment, a spreader 245, a spread-code selector 242, and a report signal receiver 243 are needed separately from the previously-described interference-report signal transmitting apparatus 30.

A wireless circuit 246 is connected to an antenna, the spreader 245, and the interference-report signal receiver 243. The wireless circuit 246 amplifies a wireless signal received from the antenna, and sends the amplified signal to the report signal receiver 243, which detects spread codes used in the vicinity from the received report signals as well as bands indicated by the signals as being usage-restricted.

A setting recorder 241 stores bands for which the interference-report signal transmitting apparatus 240 requests usage restriction. Moreover, the setting recorder 241 is connected to the spread-code selector 242 and the interference-report signal generator 244.

The spread-code selector 242 selects a spread signal to be used by the interference-report signal transmitting apparatus 240 in the method described below from the detected spread code, the detected restriction requested band, and the restricted band required by the setting recorder 241.

The spreader 245 uses the spread code selected by the spread code selector 242 to spread a transmit signal input from the interference-report signal generator 244 and outputs the spread signal to the wireless circuit 246. The wireless circuit 246 modulates the transmit signal to a predetermined frequency, and transmits the modulated signal.

With respect to the transmit timings and code selection, when the interference-report signal transmitted in the vicinity involves a band the new system base station is restricted from using, the same spread code is selected and transmitted synchronously with the interference-report signal transmitted in the vicinity. In this case, the fields set individually, such as a transmitter ID, may be spread doubly. Moreover, in this case, when there is a restriction to available spread codes, if the predetermined number of spread codes is exceeded, a predetermined common ID and a predetermined spread code may be used.

On the other hand, if the interference-report signal transmitted in the vicinity requests the new system base station to use a different band, a different spread code is selected. Moreover, a timing at which the amount of transmission of interference-report signals is expected to be at the minimum is found, at which timing the interference report signal may be transmitted.

For selecting spread codes to be used according to the usage condition of the spread codes in the vicinity, the same spread codes may be used unless it is newly found that the same spread codes are being used in the vicinity, or reporting of the interference-report signal is determined to be a failure. The failure of the transmission of the interference-report signal (improper reception at the receiver) may be due to the fact that a large amount of interference signals are still being received even after the transmission of the interference report signal, for example.

Moreover, the spreading factor may be given a predetermined value, or may be adaptively determined. For example, the spreading factor may be given a specified value at initial transmission, but may be increased when the received interference level exceeds an allowable level, and decreased as the interference level decreases.

Embodiment 8

In the above, methods of avoiding collision between interference report signals are described. However, in reality, it is very difficult to completely avoid the interference collision. In other words, even if the actual interference-report signal detector is able to detect the presence of the interference-report signal, it may not be able to normally detect the contents of the interference-report signal. For example, an error-correction code associated with the interference-report signal may be used to determine the success of reception. An example of a measure for such circumstance as described above is to ensure that signal transmission is not started for a certain predetermined period. Here, a certain predetermined period may be an interval in which an interference report signal is transmitted if such interval is predetermined, for example.

Moreover, the problem that the contents of the interference report signal cannot be successfully received is not necessarily due only to collisions of the interference-report signals, but may also be due to very low receive level (receive quality) of the interference report signals and the effect of noise, causing erroneous signal determination. In such cases as described above, the new system base station is considerably apart from the existing system receiver. Therefore, in this case, when the detected interference-report signal is not received successfully, if the receive level of the signal is not more than a predetermined value, the base station may be set to not respond to the request for prohibiting the use of the band.

Embodiment 9

Now, it is expected that conditions may not improve (completely) even after the interference-report signal transmitting apparatus has transmitted the interference report signal. In the actual communications environment, the amount of interference signal received by the existing system may not decrease (sufficiently) despite the fact that the interference-report signal has been transmitted due to the electric-wave propagation conditions, positional relationship of the base station, failure of equipment, and improper operations in the new system base station.

As measures to deal with such circumstances described above, the interference report system may be made dual-redundant (interference-report systems A, B), and the interference report system B may be used to improve the circumstances if the interference report system A fails to completely improve the circumstances.

When making the interference-report system dual-redundant, what is requested by the one interference-report system A may differ from what is requested by the other interference-report system B.

For example, a new system base station which is reported by the interference-report system B after having been reported by the interference report system A may immediately stop allocating the bands in question, and analyze the causes.

Alternatively, the following operations may be performed.

The interference-report signal detector (or the whole transmitter-receiver) of the interference-report system A may be restarted.

A maintenance or operations personnel may be reported to.

The ID of a new system base station which is a cause of interference (an interfering source) is specified and reported.

Moreover, when the cause of the interference not improving is the uplink, a user apparatus (typically a mobile station, but may be a fixed station) may be specified to be the cause. A user apparatus which has a high likelihood to be a source of the problem of intersystem interference may be determined at the operational side, so that the new system's operator may perform appropriate processing on the user apparatus, such as testing or replacing the user apparatus in question.

It is desirable that, in addition to detecting the interference signal, the interference detecting apparatus analyze the control signal of the new system and determine the frame number, uplink-downlink type, terminal identification number, etc. to be able to specify the user apparatus and the link (uplink, downlink) causing the interference.

The interference detected by the interference report system B may be reported to an authority or entity seeking proper operation of frequencies. Moreover, interference reported by the interference report system B may be sent via other public wireless communications system circuits, the wired telephone communications network, or the Internet, as opposed to reporting via electric waves.

As described above, while the present invention is described with reference to specific embodiments, the respective embodiments are merely exemplary, so that a skilled person will understand various variations, modifications, alternatives, and replacements. For example, in a system which synchronizes interference-report signals to transmit the synchronized signals, a terminal to synchronize the transmit timing with a different interference-report signal may operate asynchronously. For interference reporting according to the operation of the existing system receiver, an abnormality such as a continuous transmission of the interference-report signal is detected, and measures at the time of detecting abnormalities may be taken. Moreover, not only abnormal operations, but also terminals illegally transmitting electric waves may be monitored.

In the above embodiments, while a terminal which receives a broadcasting signal is described as an example, the present invention may be used in such applications as hospitals where it is desired to restrict communications only to those using specific frequencies due to the effect on electronic equipment. In the present specification, an example such that the new system is a communications system is shown; however, the new system may be a broadcasting system. With respect to the interference-report signal transmitting apparatus, in preparation for renewing to a new system which shares frequencies with an existing system and for changing over to a specification-modified system, a controller program may be received via a wireless or wired circuit to enable updating the receive algorithm (the so-called SDR is applied).

While specific numerical value examples are used to facilitate understanding of the present invention, such numerical values are merely exemplary, so that any appropriate value may be used. Breakdown to the respective embodiments are not essential to the present invention, so that two or more embodiments may be used as needed. For convenience of explanation, while the apparatus according to the embodiments of the present invention is explained using functional block diagrams, the apparatus may be implemented in hardware, software, or a combination thereof. The present invention is not limited to the above embodiments, so that various variations, modifications, alternatives, and replacements are included in the present invention without departing from the spirit of the present invention.

Moreover, the claims use terms of "prohibiting signal" or "prohibiting-signal transmitting apparatus". These terms respectively correspond to "interference-report signal" and "interference-report signal transmitting apparatus" in the specification and drawings. The terms used in the claims should not be interpreted on a limitative basis with respect to the terms in the specification and drawings.

The present application is based on Japanese Priority Patent Applications No. 2007-264804 filed Oct. 10, 2007, and No. 2008-188743 filed Jul. 22, 2008, with the Japanese Patent Office, the entire contents of which are hereby incorporated herein by reference.

What is claimed is:

1. A prohibiting-signal transmitting apparatus for use in a combined system such that there is at least a partial overlap between bands allocated to an old communications system and bands allocated to a new communications system, comprising:
    a unit which monitors for a band-in-use over which communications are actually being conducted, out of the bands allocated to the old communications system;
    a unit which measures an amount of interference, by the old communications system, on the new communications system;
    a unit which generates a prohibiting signal indicating that the band-in-use should not be used in the new communications system; and
    a unit which transmits the prohibiting signal to a communications apparatus of the new communications system,
    wherein a spreading factor for code-spreading the prohibiting signal is determined according to the amount of interference.

2. The prohibiting-signal transmitting apparatus as claimed in claim 1, wherein the band-in-use is monitored based on an operating condition of a receiver used in the old communications system.

3. The prohibiting-signal transmitting apparatus as claimed in claim 2, wherein, in the monitoring of the band-in-use, the operating condition of the receiver is determined according to a power of a signal received by the receiver.

4. The prohibiting-signal transmitting apparatus as claimed in claim 1, wherein a transmit power level in transmitting the prohibiting signal is determined according to the amount of interference.

5. The prohibiting-signal transmitting apparatus as claimed in claim 1, wherein, when a prohibiting signal requesting to prohibit using a specified band is received from an apparatus different from the prohibiting-signal transmitting apparatus, transmitting to the communications apparatus of the prohibiting signal indicating a band not to be used is inhibited when the specified band and the band-in-use are the same.

6. The prohibiting-signal transmitting apparatus as claimed in claim 1, wherein, when a prohibiting signal requesting to prohibit using a specified band is received from an apparatus different from the prohibiting-signal transmitting apparatus, a prohibiting signal requesting to prohibit using the band-in-use is transmitted to the communications apparatus when the specified band is different from the band-in-use.

7. The prohibiting-signal transmitting apparatus as claimed in claim 6, wherein a spread code used for the prohibiting signal indicating the band-in-use is determined according to whether the specified band and the band-in-use are the same.

8. The prohibiting-signal transmitting apparatus as claimed in claim 1, wherein, even when a specified band is the same as the band-in-use, when another prohibiting signal indicating the specified band has a receive quality which is less than a predetermined value, the prohibiting signal indicating the band-in-use is transmitted to the communications apparatus.

9. The prohibiting-signal transmitting apparatus as claimed in claim 1, wherein report information indicating a band from which use is refrained by the communications apparatus of the new communications system, out of the bands allocated to the new communications system is received from the communications apparatus, and when the band from which use is refrained that is conveyed by the report information includes the band-in-use, transmitting the prohibiting signal is inhibited.

10. The prohibiting-signal transmitting apparatus as claimed in claim 1, wherein report information indicating a band from which use is refrained by the communications apparatus of the new communications system, out of the bands allocated to the new communications system, is received from the communications apparatus, and when the band from which use is refrained that is conveyed by the report information does not include the band-in-use, the prohibiting signal is transmitted to the communications apparatus.

11. The prohibiting-signal transmitting apparatus as claimed in claim 1, wherein the prohibiting-signal transmitting apparatus is synchronous with a different prohibiting-signal transmitting apparatus having a same function as the prohibiting-signal transmitting apparatus such that a same slot boundary is recognized by the prohibiting-signal transmitting apparatuses.

12. The prohibiting-signal transmitting apparatus as claimed in claim 11, wherein a sum of s period of a prohibiting signal from the prohibiting-signal transmitting apparatus, a backoff period not before a slot boundary preceding the prohibiting signal, a postamble period not before the prohibiting signal and up to the following slot boundary amounts to a period of one slot, and the prohibiting-signal transmitting apparatus and the different prohibiting signal transmitting apparatus have mutually different backoff periods.

13. The prohibiting-signal transmitting apparatus as claimed in claim 11, wherein transmission timings of the prohibiting signal and the different prohibiting signal are such that a preamble in the prohibiting signal transmitted from the prohibiting-signal transmitting apparatus and a different preamble in the different prohibiting signal transmitted from the different prohibiting-signal transmitting apparatus are transmitted simultaneously.

14. A communications apparatus in a new communications system having a system band which overlaps at least partially with a system band of an old communications system, comprising:

a unit which receives from the old system a prohibiting signal indicating a band from which use is refrained by the new communications system, out of bands-in-use which are available to the new communications system, wherein, after receiving the prohibiting signal is stopped, whether the prohibiting signal is received is monitored for a predetermined period, and, if the prohibiting signal is not received within the predetermined period, the band from which use is refrained is used.

15. A communications apparatus in a new communications system having a system band which overlaps at least partially with a system band of an old communications system, comprising:

a unit which receives from the old system a prohibiting signal indicating a band from which use is refrained by the new communications system, out of bands-in-use which are available to the new communications system, wherein, if the prohibiting signal is not received, a signal is transmitted and whether the prohibiting signal is received is monitored in a predetermined provisional transmission period, and, if the prohibiting signal is not received within the predetermined provisional transmission period, the band from which use is refrained is used.

16. A base station apparatus used in a new mobile communications system having a system band which overlaps at least partially with a system band of an old communications system, comprising:

a scheduler which schedules wireless resources;
a unit which generates a control signal indicating the scheduling; and
a unit which transmits the control signal to a mobile station apparatus, wherein the base station apparatus further includes a unit which receives a prohibiting signal indicating a band-in-use which is actually being used in communications, out of bands allocated to the old communications system, wherein the scheduler schedules to allocate to the mobile station apparatus a band other than the band-in-use, out of bands allocated to the new communications system, and a band from which use is refrained by the base station apparatus, out of bands allocated to the new communications system is reported to the mobile station apparatus.

17. The base station apparatus as claimed in claim 16, wherein a signal indicating that the prohibiting signal should be transmitted is reported to a communications apparatus in the old communications system.

18. The base station apparatus as claimed in claim 16, wherein the base station apparatus is synchronous with a different base station apparatus having a same function as the base station apparatus such that a same slot boundary is recognized by the base station apparatuses.

19. The base station apparatus as claimed in claim 18, wherein a sum of a period of a prohibiting signal from the base station apparatus, a backoff period not before a slot boundary preceding the prohibiting signal, and a postamble period not before the prohibiting signal and up to the following slot boundary amounts to a period of one slot, and the base station apparatus and the different base station apparatus have mutually different backoff periods.

20. The base station apparatus as claimed in claim 18, wherein transmission timings of prohibiting signals are such that a preamble in the prohibiting signal transmitted from the base station apparatus and a different preamble in the different prohibiting signal transmitted from the different base station apparatus are transmitted simultaneously.

21. A combined system which includes multiple communications systems including a new communications system and an old communications system having a system band which at least partially overlaps with a system band of the new communications system, comprising a prohibiting-signal transmitting apparatus which includes a unit which monitors for a band-in-use over which, communications are actually being conducted, out of bands allocated to the old communications system;

a unit which transmits a prohibiting signal indicating that the band-in-use should not be used in the mobile communications system, and wherein a base station apparatus of the new communications system includes a unit which receives the prohibiting signal:
a scheduler which schedules wireless resources such that a band other than the band-in-use, out of bands allocated to the new communications system is allocated to a mobile station apparatus; and
a unit which transmits, to the mobile station apparatus, a control signal indicating the scheduling.

22. The combined communications system as claimed in claim 21, comprising: at least a first prohibiting-signal transmitting apparatus and a second prohibiting-signal transmitting apparatus, wherein, when a receive quality of a prohibiting signal from the first prohibiting-signal transmitting apparatus is not greater than a predetermined value, a prohibiting signal is transmitted from the second prohibiting-signal transmitting apparatus.

23. The combined communications system as claimed in claim 22, wherein transmit timings of prohibiting signals transmitted from each of one or multiple old communications systems are adjusted so as to prevent mutual collision.

24. The combined communications system as claimed in claim 22, wherein one or multiple old communications systems are synchronous such that a prohibiting-signal transmitting apparatus recognizes a same slot boundary as a different prohibiting-signal transmitting apparatus having a same function.

25. The combined communications system as claimed in claim 24, wherein a sum of a period of the prohibiting signal from the prohibiting-signal transmitting apparatus, a backoff period not before a slot boundary preceding the prohibiting signal, and a postamble period not before the prohibiting signal and up to the following slot boundary amounts to a period of one slot, and the prohibiting-signal transmitting apparatus and the different prohibiting signal transmitting apparatus have mutually different backoff periods.

26. The combined communications system as claimed in claim 24, wherein transmission timings of the prohibiting signal and the different prohibiting signal are set such that a preamble in the prohibiting signal transmitted from the prohibiting-signal transmitting apparatus and a different preamble in the different prohibiting signal from the different prohibiting-signal transmitting apparatus are transmitted simultaneously.

27. The combined communications system as claimed in claim 22, wherein the second prohibiting-signal transmitting apparatus transmits a prohibiting signal when an amount of interference from the base station apparatus is not less than the predetermined value.

28. A method which is used in a prohibiting-signal transmitting apparatus of a combined system in which there is an overlap between at least a portion of a system band of an old communications system and a system band of a new communications system, comprising the steps of:
    monitoring for a band-in-use over which communications are actually being conducted, out of bands allocated to the old communications system;
    measuring an amount of interference, by the old communications system, on the new communications system;
    generating a prohibiting signal indicating that the band-in-use should not be used in the new communications system; and
    transmitting the prohibiting signal to a communications apparatus of the new communications system,
    wherein a spreading factor for code-spreading the prohibiting signal is determined according to the amount of interference.

29. A method which is used in a base station apparatus of a new mobile communications system having a system band which overlaps at least partially with a system band of an old communications system, comprising the steps of:
    receiving a prohibiting signal indicating a band-in-use, over which communications are actually being conducted, out of bands allocated to the old communications system;
    scheduling wireless resources;
    generating a control signal indicating the scheduling; and
    transmitting the control signal to a mobile station apparatus, wherein the scheduling schedules to allocate to the mobile station apparatus a band other than the band-in-use, out of bands allocated to the new communications system,
    wherein a band from which use is refrained by the base station apparatus, out of bands allocated to the new communications system is reported to the mobile station apparatus.

* * * * *